(12) United States Patent
Jang et al.

(10) Patent No.: US 10,899,874 B2
(45) Date of Patent: Jan. 26, 2021

(54) BLOCK POLYMER AND POLYMER ELECTROLYTE MEMBRANE INCLUDING SAME

(71) Applicant: LG CHEM, LTD., Seoul (KR)

(72) Inventors: Yong Jin Jang, Daejeon (KR); Joong Jin Han, Daejeon (KR); Esder Kang, Daejeon (KR); Yunah Yu, Daejeon (KR); Youngjea Kim, Daejeon (KR)

(73) Assignee: LG CHEM, LTD, Seoul (KR)

( * ) Notice: Subject to any disclaimer, the term of this patent is extended or adjusted under 35 U.S.C. 154(b) by 375 days.

(21) Appl. No.: 15/753,095

(22) PCT Filed: Sep. 22, 2016

(86) PCT No.: PCT/KR2016/010582
§ 371 (c)(1),
(2) Date: Feb. 15, 2018

(87) PCT Pub. No.: WO2017/052226
PCT Pub. Date: Mar. 30, 2017

(65) Prior Publication Data
US 2018/0251592 A1  Sep. 6, 2018

(30) Foreign Application Priority Data

Sep. 22, 2015 (KR) .................. 10-2015-0133845
Sep. 9, 2016 (KR) .................. 10-2016-0116613

(51) Int. Cl.
*C08G 61/12* (2006.01)
*H01M 8/1032* (2016.01)
(Continued)

(52) U.S. Cl.
CPC ............. *C08G 61/12* (2013.01); *B01D 69/02* (2013.01); *B01D 71/80* (2013.01); *C08J 5/2256* (2013.01);
(Continued)

(58) Field of Classification Search
None
See application file for complete search history.

(56) References Cited

U.S. PATENT DOCUMENTS

2008/0114149 A1 * 5/2008 Moore ................... C08G 75/23
528/293
2010/0234479 A1   9/2010 Lalgudi et al.
(Continued)

FOREIGN PATENT DOCUMENTS

KR   10-2003-0076057 A   9/2003
KR   10-2014-0145997 A   12/2014
(Continued)

OTHER PUBLICATIONS

International Search Report for PCT/KR2016/010582 (PCT/ISA/210) dated Feb. 6, 2017.
(Continued)

*Primary Examiner* — Daniel S Gatewood
(74) *Attorney, Agent, or Firm* — Birch, Stewart, Kolasch & Birch, LLP

(57) ABSTRACT

The present specification relates to a block polymer and a polymer electrolyte membrane comprising the same, a membrane-electrode assembly comprising the polymer electrolyte membrane, a fuel cell comprising the membrane-electrode assembly, and a redox flow battery comprising the polymer electrolyte membrane.

17 Claims, 3 Drawing Sheets

(51) Int. Cl.
    *H01M 8/18* (2006.01)
    *B01D 71/80* (2006.01)
    *H01M 8/1039* (2016.01)
    *H01M 8/1023* (2016.01)
    *B01D 69/02* (2006.01)
    *H01M 8/1067* (2016.01)
    *H01M 8/103* (2016.01)
    *H01M 8/1027* (2016.01)
    *H01M 8/1034* (2016.01)
    *H01M 8/1025* (2016.01)
    *C08J 5/22* (2006.01)
    *H01M 8/1004* (2016.01)
    *B01D 71/62* (2006.01)
    *B01D 71/68* (2006.01)
    *H01M 8/1018* (2016.01)
    *B01D 71/32* (2006.01)

(52) U.S. Cl.
CPC ......... *H01M 8/103* (2013.01); *H01M 8/1004* (2013.01); *H01M 8/1023* (2013.01); *H01M 8/1025* (2013.01); *H01M 8/1027* (2013.01); *H01M 8/1032* (2013.01); *H01M 8/1034* (2013.01); *H01M 8/1039* (2013.01); *H01M 8/1067* (2013.01); *H01M 8/18* (2013.01); *H01M 8/188* (2013.01); *B01D 71/32* (2013.01); *B01D 71/62* (2013.01); *B01D 71/68* (2013.01); *B01D 2325/04* (2013.01); *B01D 2325/14* (2013.01); *B01D 2325/16* (2013.01); *B01D 2325/26* (2013.01); *B01D 2325/28* (2013.01); *B01D 2325/42* (2013.01); *C08G 2261/1452* (2013.01); *C08G 2261/3442* (2013.01); *C08G 2261/3444* (2013.01); *C08G 2261/516* (2013.01); *C08J 2365/00* (2013.01); *H01M 2008/1095* (2013.01); *H01M 2300/0025* (2013.01); *Y02E 60/50* (2013.01)

(56) References Cited

U.S. PATENT DOCUMENTS

| | | | |
|---|---|---|---|
| 2011/0020731 A1* | 1/2011 | Yoshimura | H01B 1/122 429/483 |
| 2014/0065512 A1* | 3/2014 | Kwon | H01M 8/1039 429/480 |
| 2015/0218313 A1 | 8/2015 | Wang et al. | |
| 2015/0328630 A1 | 11/2015 | Yoo et al. | |
| 2016/0260994 A1* | 9/2016 | Kong | C08J 5/2237 |

FOREIGN PATENT DOCUMENTS

| | | | | |
|---|---|---|---|---|
| KR | 20150048639 A | * | 5/2015 | ............ C08J 5/2281 |
| WO | WO 2017/171290 A1 | | 12/2014 | |

OTHER PUBLICATIONS

Extended European Search Report issued in corresponding European Application No. 16848951.6 dated Aug. 17, 2018.

* cited by examiner

【FIG. 1】
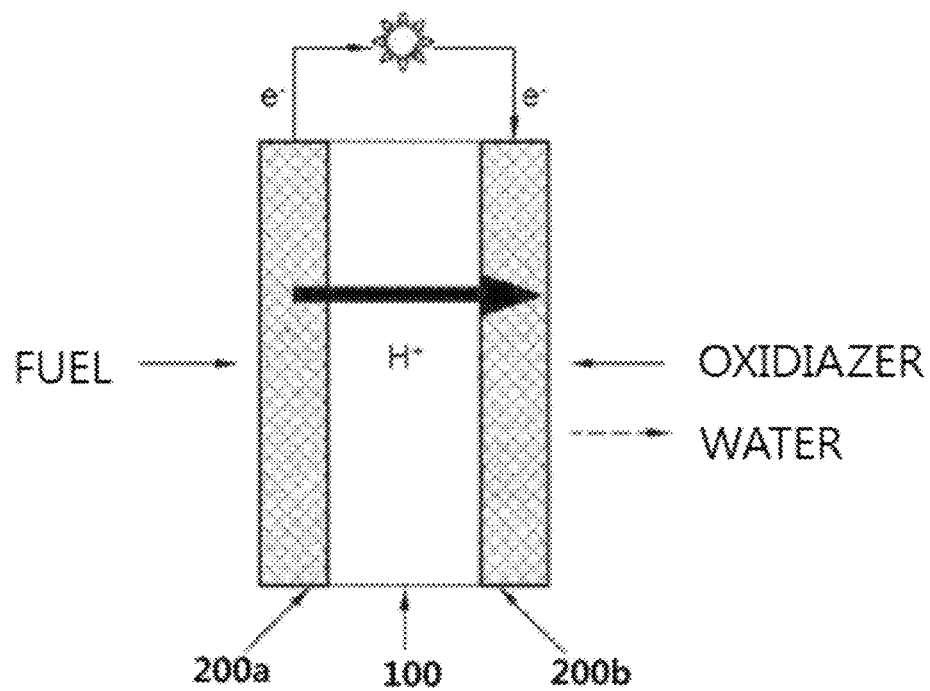
【FIG. 2】
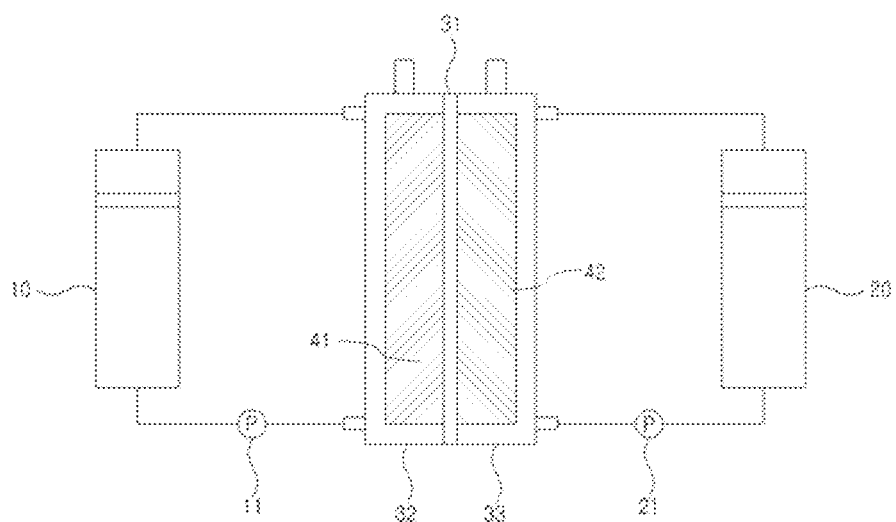

[FIG. 3]
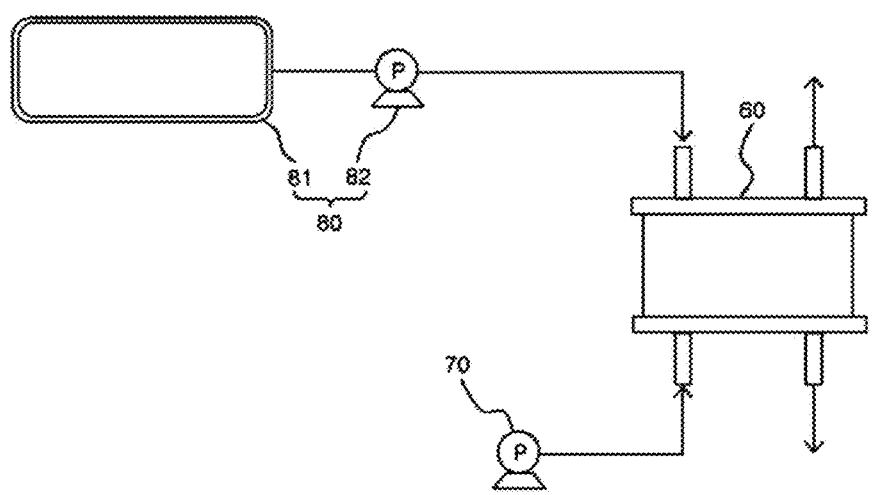
[FIG. 4]
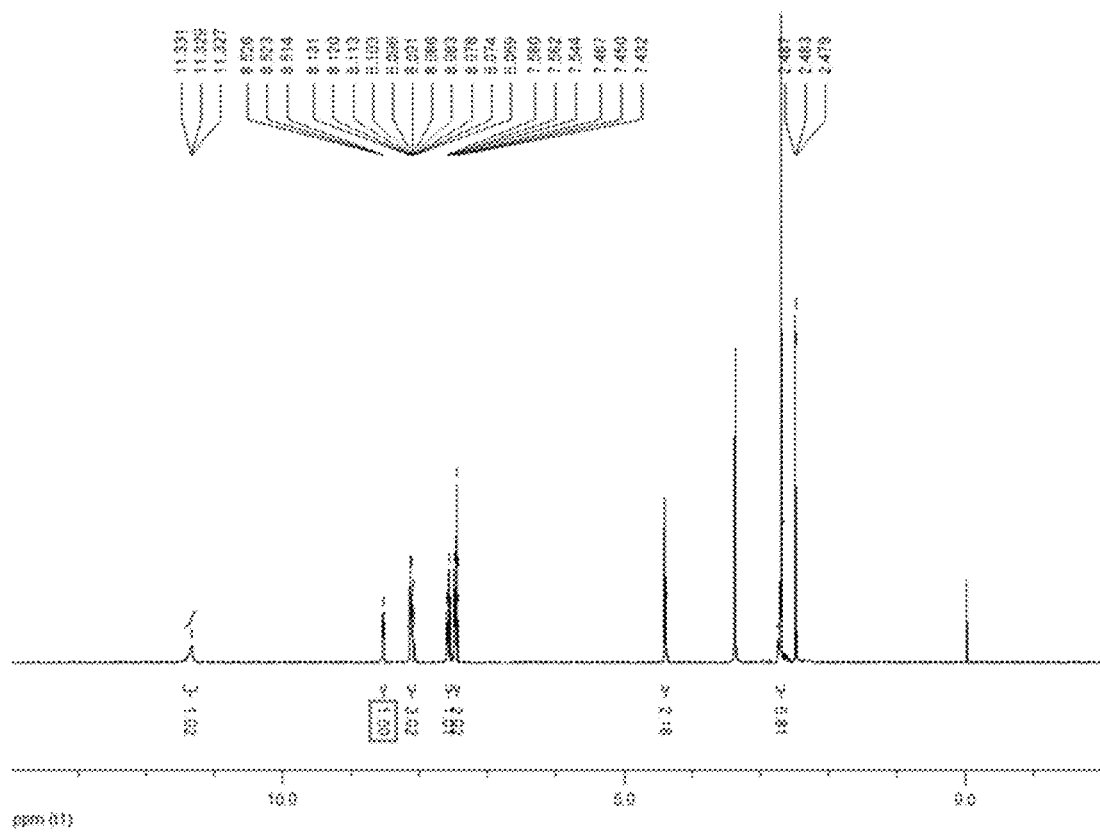

[FIG. 5]
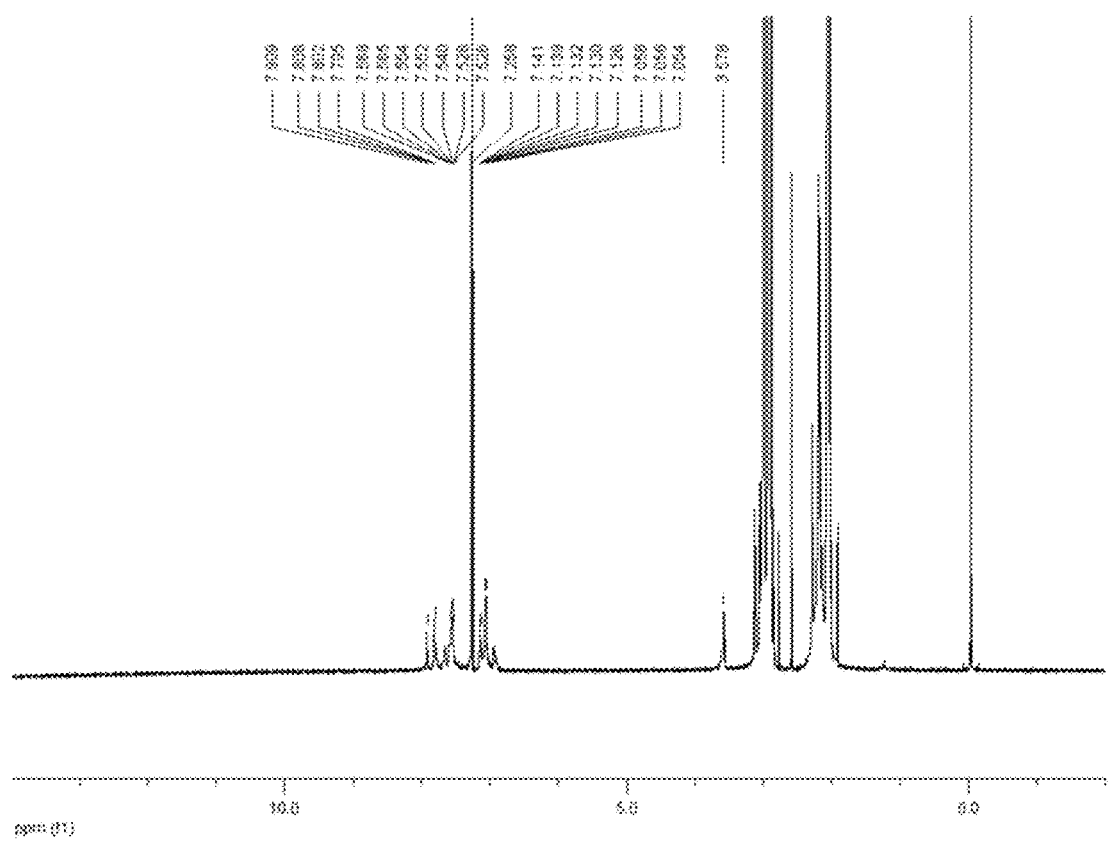

BLOCK POLYMER AND POLYMER ELECTROLYTE MEMBRANE INCLUDING SAME

TECHNICAL FIELD

The present specification claims priority to and the benefits of Korean Patent Application No. 10-2015-0133845, filed with the Korean Intellectual Property Office on Sep. 22, 2015, and Korean Patent Application No. 10-2016-0116613, filed with the Korean Intellectual Property Office on Sep. 9, 2016, the entire contents of which are incorporated herein by reference.

The present specification relates to a block polymer and a polymer electrolyte membrane comprising the same.

BACKGROUND ART

A fuel cell is an energy conversion device directly converting chemical energy of fuel into electric energy. In other words, a fuel cell employs a power generation method utilizing a fuel gas and an oxidizer, and using electrons generated during an oxidation-reduction reaction thereof to produce power. A membrane-electrode assembly (MEA) of a fuel cell is a part where an electrochemical reaction of hydrogen and oxygen occurs, and is formed with a cathode, an anode and an electrolyte membrane, that is, an ion conductive electrolyte membrane.

A redox flow battery (oxidation-reduction flow battery) is a system charged and discharged by active materials included in a liquid electrolyte being oxidized and reduced, and is an electrochemical storage device directly storing chemical energy of the active materials as electric energy. A unit cell of the redox flow battery includes an electrode, an electrolyte and an ion-exchange membrane (electrolyte membrane).

Due to their high energy efficiency and environmental friendly properties of low contaminant emissions, fuel cells and redox flow batteries have been researched and developed as a next generation energy source.

A core constituent in a fuel cell and a redox flow battery is a polymer electrolyte membrane capable of cation exchange, and properties of 1) excellent proton conductivity, 2) preventing an electrolyte crossover, 3) high chemical resistance, 4) strengthening mechanical properties and/or 4) low swelling ratio are favorably required. The polymer electrolyte membrane is divided into fluorine-based, partial fluorine-based, hydrocarbon-based and the like, and a partial fluorine-based polymer electrolyte membrane has advantages of exhibiting excellent physical and chemical stability and high thermal stability by having a fluorine-based main chain. In addition, in the partial fluorine-based polymer electrolyte membrane, a cation transfer functional group is attached at the end of the fluorine-based chain as in a fluorine-based polymer electrolyte membrane, and therefore, advantages of both a hydrocarbon-based polymer electrolyte membrane and a fluorine-based polymer electrolyte membrane are capable of being obtained.

However, a partial fluorine-based polymer electrolyte membrane has a problem in that cation conductivity is relatively low since micro-phase separation and aggregation of a cation transfer functional group are not effectively controlled. Accordingly, researches have been progressed in the direction of securing high cation conductivity through controlling distribution and micro-phase separation of a sulfonic acid group.

DISCLOSURE

Technical Problem

The present specification is directed to providing a polymer and a polymer electrolyte membrane comprising the same.

Technical Solution

One embodiment of the present specification provides a block polymer comprising a hydrophobic block; and a hydrophilic block, wherein the hydrophobic block includes at least one cationic side chain, and the hydrophilic block comprises a unit derived from a compound represented by the following Chemical Formula 1.

[Chemical Formula 1]

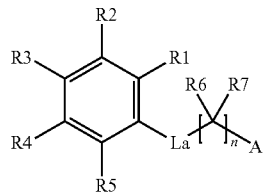

In Chemical Formula 1,

A is —$SO_3H$, —$SO_3^-M^+$, —COOH, —$COO^-M^+$, —$PO_3H_2$, —$PO_3H^-M^+$, —$PO_3^{2-}2M^+$, —$O(CF_2)_mSO_3H$, —$O(CF_2)_mSO_3^-M^+$, —$O(CF_2)_mCOOH$, —$O(CF_2)_mCOO^-M^+$, —$O(CF_2)_mPO_3H_2$, —$O(CF_2)_mPO_3H^-M^+$ or —$O(CF_2)_mPO_3^{2-}2M^+$, m is an integer of 2 to 6, M is a group 1 element, R1 to R5 are the same as or different from each other, and each independently hydrogen; a halogen group; or a hydroxyl group, at least two of R1 to R5 are a halogen group; or a hydroxyl group, R6 and R7 are the same as or different from each other, and each independently a halogen group, La is a direct bond; S; O; NRa; $SO_2$; or a substituted or unsubstituted alkylene group having 1 to 10 carbon atoms, Ra is hydrogen; or a substituted or unsubstituted alkyl group, and n is an integer of 2 to 10, and structures in the 2 to 10 parentheses are the same as or different from each other.

One embodiment of the present specification provides a polymer electrolyte membrane comprising the block polymer.

In addition, one embodiment of the present specification provides a membrane-electrode assembly comprising an anode; a cathode; and the polymer electrolyte membrane described above provided between the anode and the cathode.

One embodiment of the present specification provides a polymer electrolyte-type fuel cell comprising two or more of the membrane-electrode assemblies described above; a stack comprising a bipolar plate provided between the membrane-electrode assemblies; a fuel supplying unit supplying fuel to the stack; and an oxidizer supplying unit supplying an oxidizer to the stack.

Lastly, one embodiment of the present specification provides a redox flow battery comprising a positive electrode cell comprising a positive electrode and a positive electrode liquid electrolyte; a negative electrode cell comprising a negative electrode and a negative electrode liquid electrolyte; and the polymer electrolyte membrane described above provided between the positive electrode cell and the negative electrode cell.

Advantageous Effects

A polymer electrolyte membrane comprising a block polymer according to one embodiment of the present specification readily forms a hydrophilic-hydrophobic phase separation structure.

In addition, by controlling the phase separation structure, the polymer electrolyte membrane efficiently forms a hydrophilic channel in the polymer electrolyte membrane.

Additionally, the polymer electrolyte membrane comprising the block polymer according to one embodiment of the present specification can have advantages of both a cation polymer electrolyte membrane and an anion polymer electrolyte membrane.

The polymer electrolyte membrane according to one embodiment of the present specification has excellent proton conductivity. As a result, high performance of a fuel cell and/or a redox flow battery comprising the same is obtained.

In addition, a polymer electrolyte-type fuel cell comprising the polymer electrolyte membrane according to one embodiment of the present specification is capable of preventing a gas crossover, and enhancing ion conductivity even under a low humidity condition.

Additionally, a redox flow battery comprising the polymer electrolyte membrane according to one embodiment of the present specification is capable of reducing a vanadium ion crossover.

DESCRIPTION OF DRAWINGS

FIG. 1 is a schematic diagram showing a principle of electricity generation of a fuel cell.

FIG. 2 is a diagram schematically illustrating one embodiment of a redox flow battery.

FIG. 3 is a diagram schematically illustrating one embodiment of a fuel cell.

FIG. 4 is a diagram showing a H-NMR spectrum of Compound B.

FIG. 5 is a diagram showing a H-NMR spectrum of Intermediate 1.

100: Electrolyte Membrane
200a: Anode
200b: Cathode
10, 20: Tank
11, 21: Pump
31: Electrolyte Membrane
32: Positive Electrode Cell
33: Negative Electrode Cell
41: Positive Electrode Liquid Electrolyte
42: Negative Electrode Liquid Electrolyte
60: Stack
70: Oxidizer Supplying Unit
80: Fuel Supplying Unit
81: Fuel Tank
82: Pump

MODE FOR DISCLOSURE

Hereinafter, the present specification will be described in more detail.

In the present specification, a description of a certain part "comprising" certain constituents means capable of further including other constituents, and does not exclude other constituents unless particularly stated on the contrary.

In the present specification, a 'unit' is a repeated structure of a monomer being comprised in a polymer, and means a structure of a monomer being combined in a polymer through polymerization.

In the present specification, the meaning of 'including a unit' means being comprised in a main chain in a polymer.

In the present specification,

means bonding to adjacent substituents or a main chain of a polymer.

In the present specification, the block polymer means a polymer formed by one block, and one, two or more blocks that are different from the one block being linked to each other by a polymer main chain.

In one embodiment of the present specification, the block polymer may comprise a hydrophilic block and a hydrophobic block. Specifically, in one embodiment, the block polymer may comprise a hydrophilic block comprising a unit represented by Chemical Formula 1, and a hydrophobic block having a cationic side chain.

The "hydrophilic block" of the present specification means a block having an ion-exchange group as a functional group. Herein, the functional group may be at least any one selected from the group consisting of —$SO_3H$, —$SO_3^-M^+$, —COOH, —$COO^-M^+$, —$PO_3H_2$, —$PO_3H^-M^+$, —$PO_3^{2-}2M^+$, —$O(CF_2)_mSO_3H$, —$O(CF_2)_mSO_3^-M^+$, —$O(CF_2)_mCOOH$, —$O(CF_2)_mCOO^-M^+$, —$O(CF_2)_mPO_3H_2$, —$O(CF_2)_mPO_3H^-M^+$ and —$O(CF_2)_mPO_3^{2-}2M^+$. Herein, M may be a metallic element. In other words, the functional group may be hydrophilic.

A first unit represented by Chemical Formula 1 according to one embodiment of the present specification may exhibit hydrophilicity by comprising a functional group of A.

The "block having an ion-exchange group" of the present specification means a block comprising an average of 0.5 or more ion-exchange groups when expressing as the number of ion-exchange groups per one structure unit forming the corresponding block, and comprising an average of 1.0 or more ion-exchange groups per one structure unit is more preferred.

In one embodiment of the present specification, the hydrophobic block comprises —(C=O)—; or —($SO_2$)— in the main chain.

In one embodiment of the present specification, the cationic side chain may be -(L)o-$N^+RR'R''$; -(L)o-$P^+RR'R''$; or the following Chemical Formula 1-A,

[Chemical Formula 1-A]

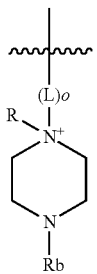

L is a direct bond; O; NR'''; S; SO₂; or a substituted or unsubstituted alkylene group having 1 to 10 carbon atoms, o is an integer of 1 to 10, when o is 2 or greater, two or more Ls are the same as or different from each other, and R, R', R", R''' and Rb are the same as or different from each other, and each independently hydrogen; or a substituted or unsubstituted alkyl group having 1 to 10 carbon atoms.

In another embodiment, the hydrophobic block comprises a unit represented by the following Chemical Formula 2 or Chemical Formula 3.

[Chemical Formula 2]

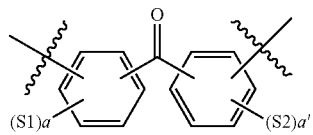

[Chemical Formula 3]

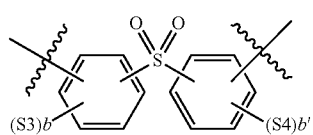

In Chemical Formula 2 and Chemical Formula 3,

S1 to S4 are the same as or different from each other, and each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L)o-N⁺RR'R"; -(L)o-P⁺RR'R"; or the following Chemical Formula 1-A,

[Chemical Formula 1-A]

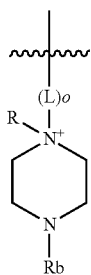

L is a direct bond; O; NR'''; S; or a substituted or unsubstituted alkylene group having 1 to 10 carbon atoms, o is an integer of 1 to 10, when o is 2 or greater, two or more Ls are the same as or different from each other, R, R', R", R''' and Rb are the same as or different from each other, and each independently hydrogen; or a substituted or unsubstituted alkyl group having 1 to 10 carbon atoms, a, a', b and b' are each an integer of 1 to 4, and when a, a', b and b' are each an integer of 2 or greater, structures in the two or more parentheses are the same as or different from each other.

In one embodiment of the present specification, the hydrophobic block comprises at least one cationic side chain.

An existing cationic polymer electrolyte membrane comprising a block having an ion exchange group has had problems of low durability, and decreasing battery efficiency caused by a vanadium ion crossover through the membrane.

The block polymer according to one embodiment of the present specification comprises at least one cationic side chain in the hydrophobic block, and thereby is capable of preventing a vanadium ion crossover through the membrane, and as a result, current efficiency may be improved.

According to an embodiment of the present specification, the hydrophilic block and the hydrophobic block are clearly divided and separated in the block polymer and phase separation is readily obtained, and therefore, ions are readily transferred. According to one embodiment of the present specification, the hydrophilic block and the hydrophobic block are more clearly divided when including the unit represented by Chemical Formula 1, and an ion transfer effect may be more superior than existing polymers.

In addition, the block polymer according to one embodiment of the present specification may exhibit advantages of a cation polymer electrolyte membrane having the unit represented by Chemical Formula 1 comprised in the hydrophilic block and advantages of an anion polymer electrolyte membrane comprised in the hydrophobic block.

In one embodiment of the present specification, the hydrophobic block or the hydrophilic block further comprises a unit derived from a compound represented by the following Chemical Formula 4.

[Chemical Formula 4]

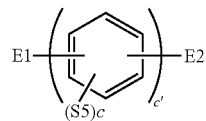

In Chemical Formula 4,

E1 and E2 are a hydroxyl group or a thiol group,

S5 is hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L)o-N⁺RR'R"; -(L)o-P⁺RR'R"; or the following Chemical Formula 1-A,

[Chemical Formula 1-A]

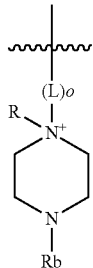

L is a direct bond; O; NR'''; S; or a substituted or unsubstituted alkylene group having 1 to 10 carbon atoms,
o is an integer of 1 to 10,
when o is 2 or greater, two or more Ls are the same as or different from each other,
R, R', R'', R''' and Rb are the same as or different from each other, and each independently hydrogen; or a substituted or unsubstituted alkyl group having 1 to 10 carbon atoms,
c is an integer of 1 to 4,
c' is an integer of 1 to 3, and
when c and c' are each an integer of 2 or greater, structures in the two or more parentheses are the same as or different from each other.

In one embodiment of the present specification, the hydrophobic block comprises a unit represented by the following Chemical Formula 2 or Chemical Formula 3; and a unit derived from a compound represented by Chemical Formula 4.

[Chemical Formula 2]

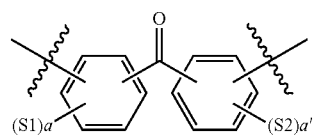

[Chemical Formula 3]

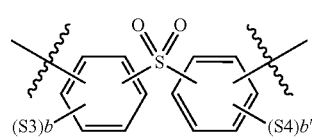

[Chemical Formula 4]

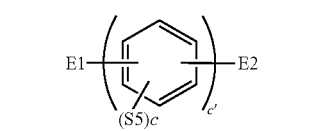

In Chemical Formulae 2 to 4,
E1 and E2 are a hydroxyl group or a thiol group,
S1 to S5 are the same as or different from each other, and each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L)o-N$^+$RR'R''; -(L)o-P$^+$RR'R''; or the following Chemical Formula 1-A,

[Chemical Formula 1-A]

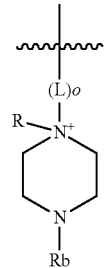

L is a direct bond; O; NR'''; S; or a substituted or unsubstituted alkylene group having 1 to 10 carbon atoms,
o is an integer of 1 to 10,
when o is 2 or greater, two or more Ls are the same as or different from each other,
R, R', R'', R''' and Rb are the same as or different from each other, and each independently hydrogen; or a substituted or unsubstituted alkyl group having 1 to 10 carbon atoms,
a, a', b, b' and c are each an integer of 1 to 4,
c' is an integer of 1 to 3, and
when a, a', b, b', c and c' are each an integer of 2 or greater, structures in the two or more parentheses are the same as or different from each other.

In one embodiment of the present specification, R, R' and R'' are the same as or different from each other, and each independently an alkyl group having 1 to 10 carbon atoms.

In one embodiment, R, R' and R'' are a methyl group.

In one embodiment of the present specification, the unit represented by Chemical Formula 2 is represented by the following Chemical Formula 2-1.

[Chemical Formula 2-1]

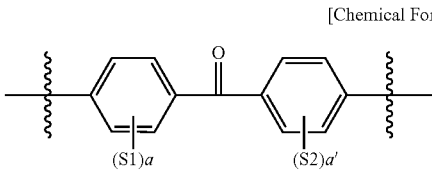

In Chemical Formula 2-1, S1, S2, a and a' are the same as described above.

In one embodiment of the present specification, the unit represented by Chemical Formula 3 is represented by the following Chemical Formula 3-1.

[Chemical Formula 3-1]

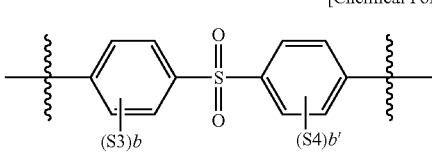

In Chemical Formula 3-1, S3, S4, b and b' are the same as described above.

In one embodiment of the present specification, E1 and E2 are a hydroxyl group or a thiol group.

In another embodiment, E1 is a hydroxyl group.

In another embodiment, E1 is a thiol group.

In one embodiment of the present specification, E2 is a hydroxyl group.

In another embodiment, E2 is a thiol group.

In one embodiment of the present specification, c' is 1.

In another embodiment, c' is 2.

In one embodiment of the present specification, the compound represented by Chemical Formula 4 is represented by any one of the following Chemical Formulae 4-1 to 4-4.

[Chemical Formula 4-1]

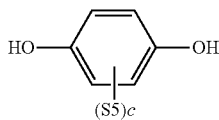

[Chemical Formula 4-2]

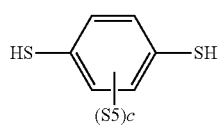

[Chemical Formula 4-3]

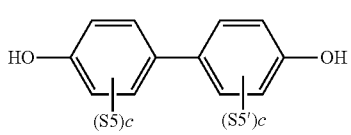

[Chemical Formula 4-4]

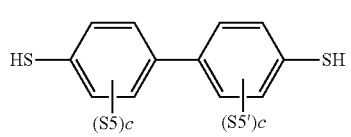

In Chemical Formulae 4-1 to 4-4,

S5 and c have the same definitions as above,

S5' is the same as or different from S5, and each independently has the same definition as S5.

In the present specification, an S atom is used as a linker of a $-[CR6R7]_n-A$ structure and a benzene ring in Chemical Formula 1. In this case, an electron withdrawing character of the $-[CR6R7]_n-A$ linked by the S atom allows the polymer to be readily formed, and a stable polymer may be provided.

In one embodiment of the present specification, R6 and R7 are the same as or different from each other, and each independently a halogen group. Specifically, R6 and R7 may be each independently selected from the group consisting of F; Cl; Br; and I.

When a polymer comprising the unit represented by Chemical Formula 1 of the present specification is comprised in the polymer electrolyte membrane and R6 and R7 of Chemical Formula 1 are a halogen group, there is an advantage in that electrons are favorably attracted facilitating hydrogen ion migration, and a structure of the polymer electrolyte membrane is strengthened. Specifically, according to one embodiment of the present specification, the advantage may be maximized when R6 and R7 are fluorine.

In one embodiment of the present specification, n is an integer of 2 to 10. In another embodiment of the present specification, n is an integer of 2 to 6.

In a monomer comprising the unit of Chemical Formula 1 according to one embodiment of the present specification, the number of n may be controlled. In this case, a length of the structure in the parenthesis may be controlled to perform a role of facilitating a phase separation phenomenon of the polymer electrolyte membrane, and hydrogen ion migration of the polymer electrolyte membrane may be facilitated. In addition, in the monomer comprising the unit of Chemical Formula 1, differences in the reactivity and physical properties of a final polymer may be controlled as necessary by controlling a length of the structure in the parenthesis.

In one embodiment of the present specification, R3 and R5 are fluorine.

In one embodiment of the present specification, as the fluorine of R3 and the fluorine of R5 fall off, the unit derived from the compound represented by Chemical Formula 1 may be comprised in the polymer.

In one embodiment of the present specification, n is 2.

In another embodiment, n is 3.

In another embodiment, n is 4.

In another embodiment, n is 5.

In another embodiment, n is 6.

In another embodiment, n is 7.

In one embodiment of the present specification, n is 8.

In another embodiment, n is 9.

In one embodiment of the present specification, n is 10.

In one embodiment of the present specification, A is $-SO_3H$ or $-SO_3^-M^+$.

In another embodiment, A is $-SO_3H$.

As described above, when A is $-SO_3H$ or $-SO_3^-M^+$ in Chemical Formula 1, a chemically stable polymer may be formed.

In one embodiment of the present specification, M is a group 1 element.

In the present specification, the group 1 element may be Li, Na or K.

In one embodiment of the present specification, the unit derived from the compound represented by Chemical Formula 1 is represented by any one of the following Chemical Formulae 7 to 9.

[Chemical Formula 7]

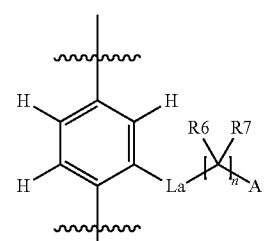

[Chemical Formula 8]

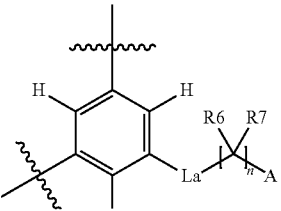

[Chemical Formula 9]

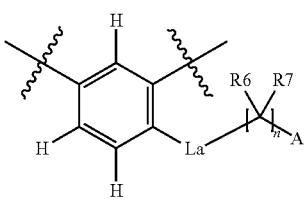

In Chemical Formulae 7 to 9, La, R6, R7, n and A have the same definitions as in Chemical Formula 1.

In one embodiment of the present specification, the first unit derived from the compound represented by Chemical Formula 1 is represented by any one of the following Chemical Formulae 1-1 to 1-18.

[Chemical Formula 1-1]

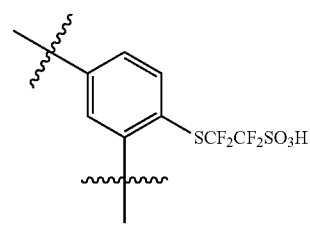

[Chemical Formula 1-2]

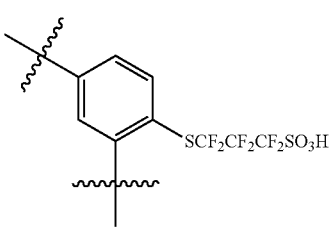

[Chemical Formula 1-3]

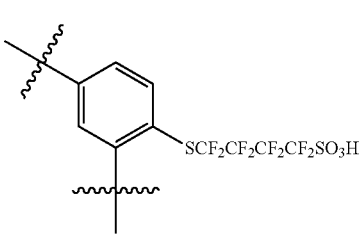

[Chemical Formula 1-4]

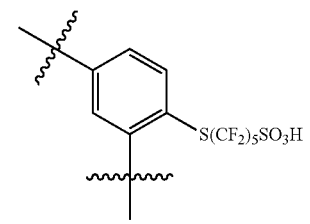

[Chemical Formula 1-5]

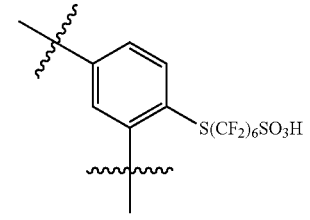

[Chemical Formula 1-6]

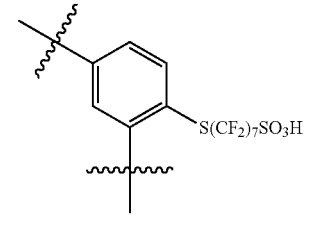

-continued

[Chemical Formula 1-7]

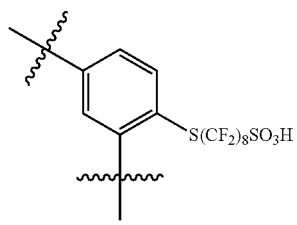

[Chemical Formula 1-8]

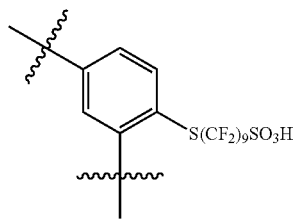

[Chemical Formula 1-9]

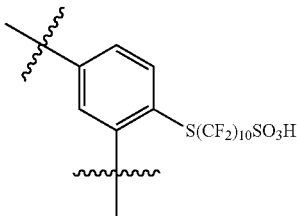

[Chemical Formula 1-10]

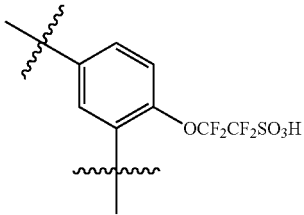

[Chemical Formula 1-11]

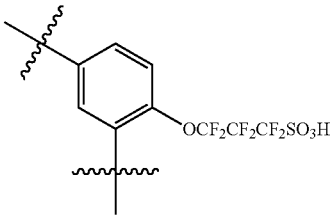

[Chemical Formula 1-12]

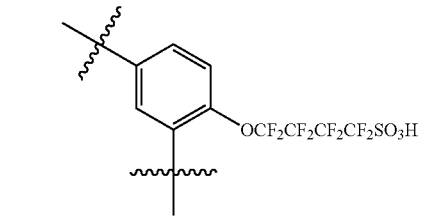

[Chemical Formula 1-13]

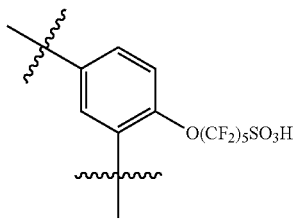

[Chemical Formula 1-14]

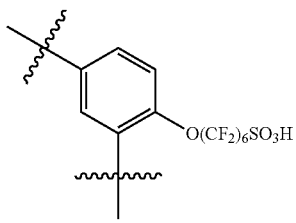

[Chemical Formula 1-15]

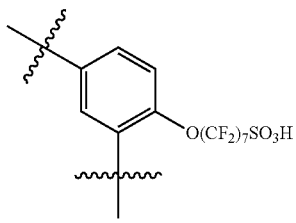

[Chemical Formula 1-16]

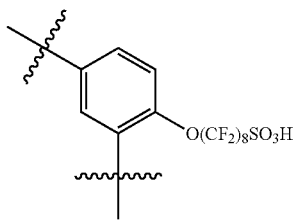

[Chemical Formula 1-17]

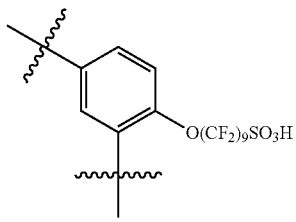

[Chemical Formula 1-18]

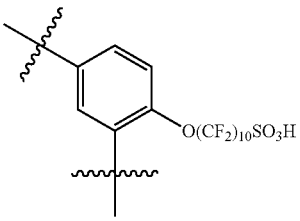

[Chemical Formula 1-19]

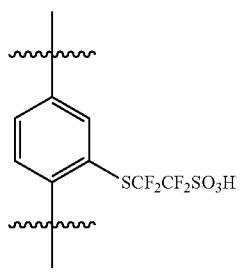

[Chemical Formula 1-20]

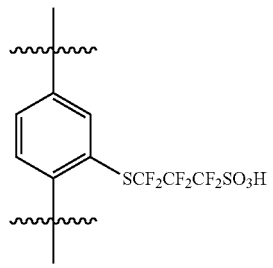

[Chemical Formula 1-21]

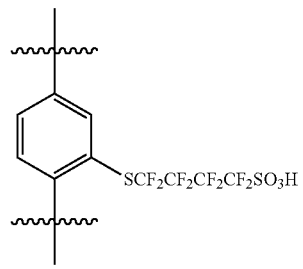

[Chemical Formula 1-22]

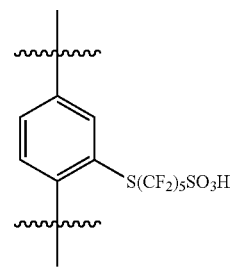

[Chemical Formula 1-23]

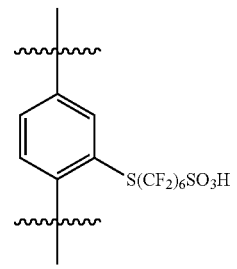

In one embodiment of the present specification, the first unit derived from the compound represented by Chemical Formula 1 is represented by any one of the following Chemical Formulae 1-19 to 1-36.

[Chemical Formula 1-24]
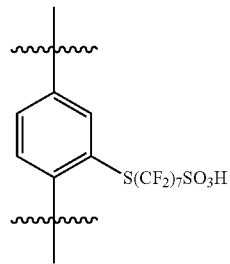
[Chemical Formula 1-25]
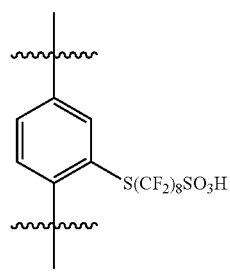
[Chemical Formula 1-26]
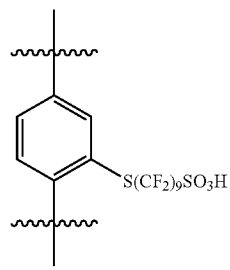
[Chemical Formula 1-27]
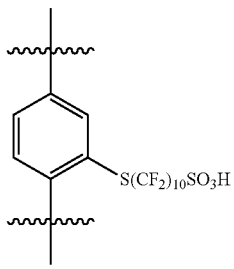
[Chemical Formula 1-28]
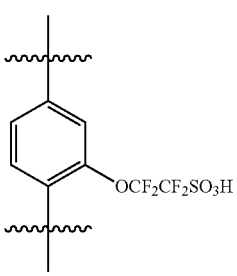
[Chemical Formula 1-29]
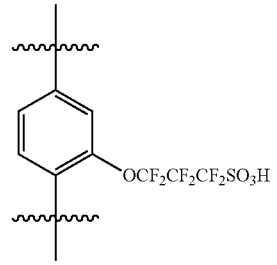
[Chemical Formula 1-30]
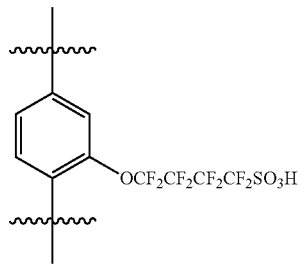
[Chemical Formula 1-31]
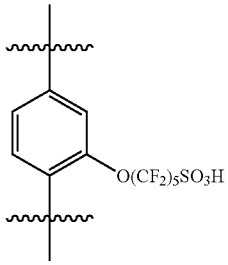
[Chemical Formula 1-32]
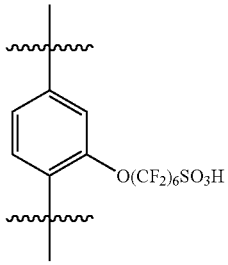
[Chemical Formula 1-33]
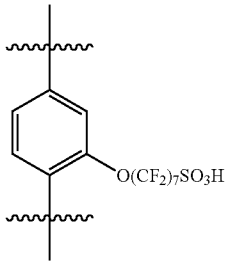

[Chemical Formula 1-34]

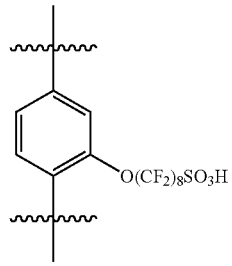

[Chemical Formula 1-35]

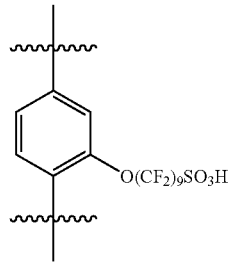

[Chemical Formula 1-36]

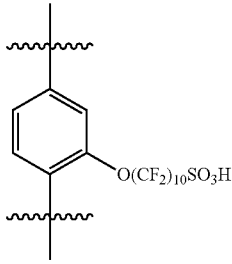

In one embodiment of the present specification, the first unit derived from the compound represented by Chemical Formula 1 is represented by any one of the following Chemical Formulae 1-37 to 1-54.

[Chemical Formula 1-37]

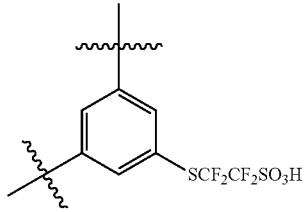

[Chemical Formula 1-38]

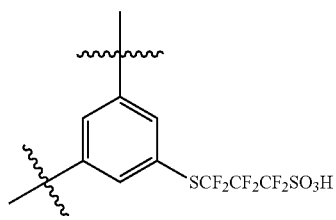

[Chemical Formula 1-39]

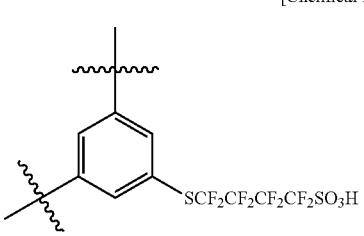

[Chemical Formula 1-40]

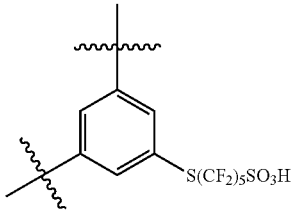

[Chemical Formula 1-41]

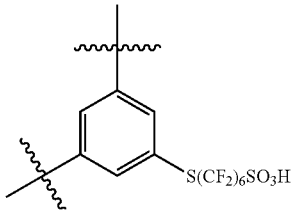

[Chemical Formula 1-42]

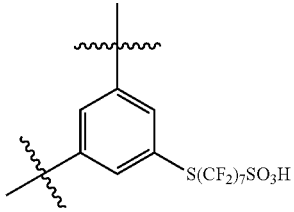

[Chemical Formula 1-43]

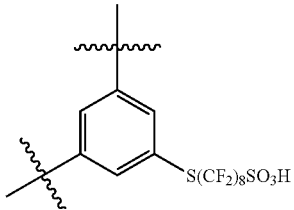

[Chemical Formula 1-44]

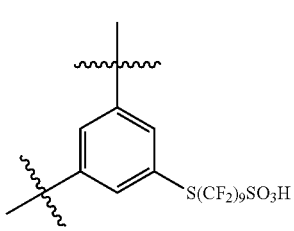

[Chemical Formula 1-45]

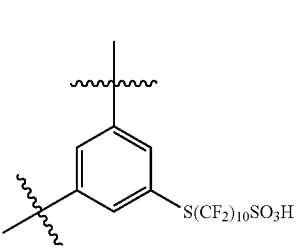

[Chemical Formula 1-46]

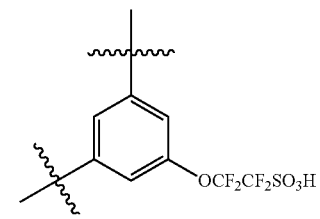

[Chemical Formula 1-47]

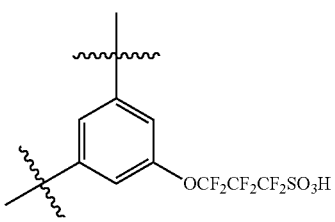

[Chemical Formula 1-48]

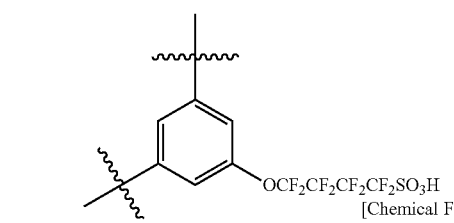

[Chemical Formula 1-49]

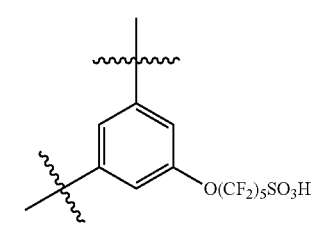

[Chemical Formula 1-50]

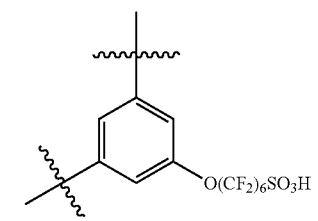

[Chemical Formula 1-51]

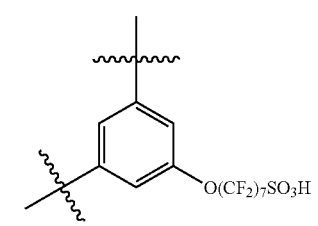

[Chemical Formula 1-52]

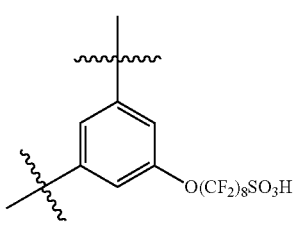

[Chemical Formula 1-53]

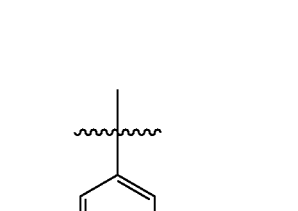

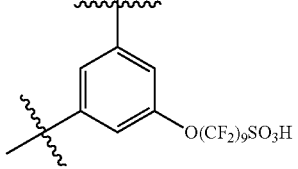

[Chemical Formula 1-54]

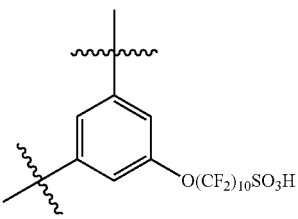

In one embodiment of the present specification, the hydrophilic block comprises the unit represented by Chemical Formula 1; and the unit derived from the compound represented by Chemical Formula 4.

In one embodiment of the present specification, S1 is -(L)o-N$^+$RR'R".

In another embodiment, S2 is -(L)o-N$^+$RR'R".

In one embodiment of the present specification, S3 is -(L)o-N$^+$RR'R".

In one embodiment of the present specification, it is sufficient that the block polymer comprises a cation side chain, and a position thereof is not limited.

In one embodiment of the present specification, the block polymer comprises a unit represented by any one of the following Chemical Formulae A to J and A-1 to J-1.

[Chemical Formula A]

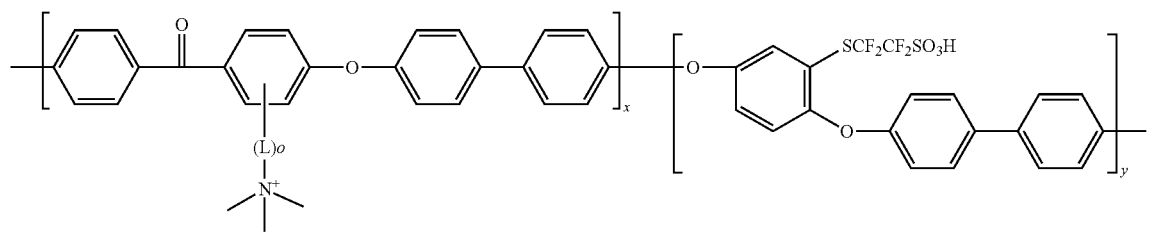

-continued
[Chemical Formula A-1]
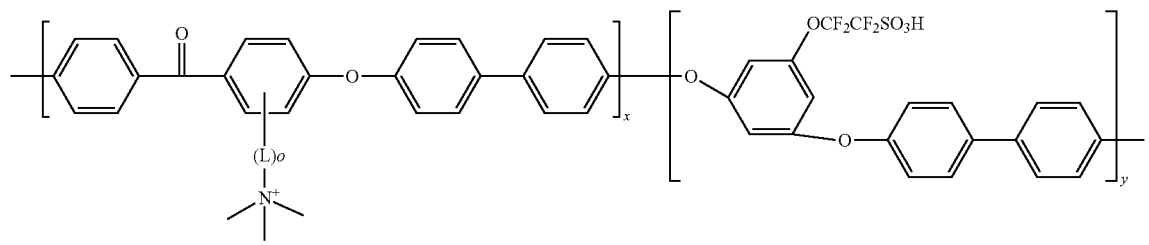
[Chemical Formula B]
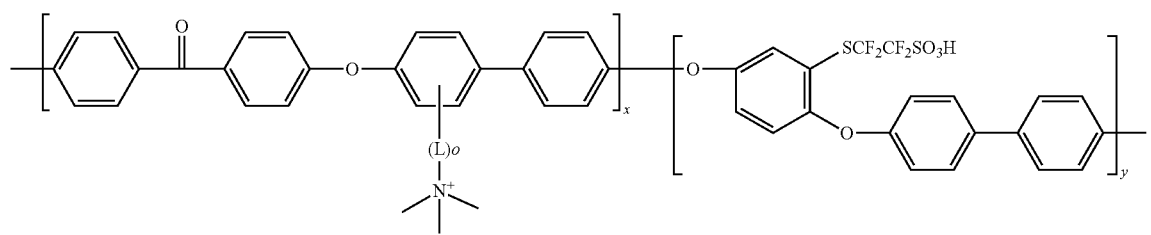
[Chemical Formula B-1]
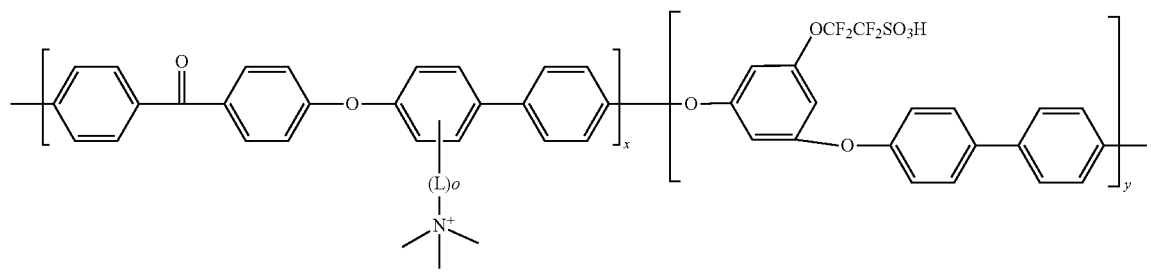
[Chemical Formula C]
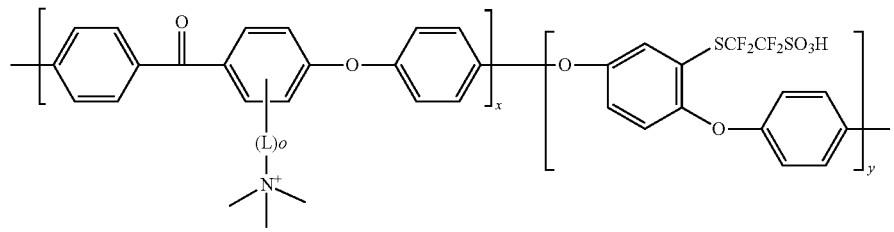
[Chemical Formula C-1]
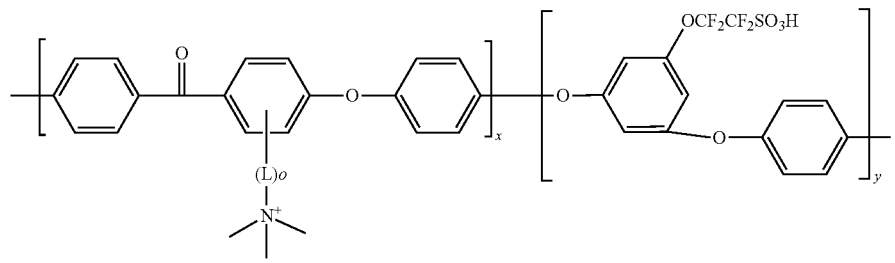
[Chemical Formula D]
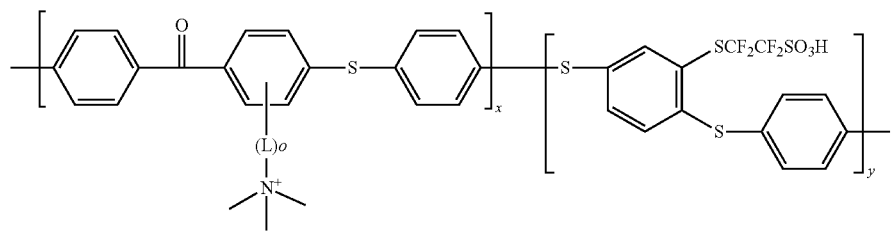

-continued
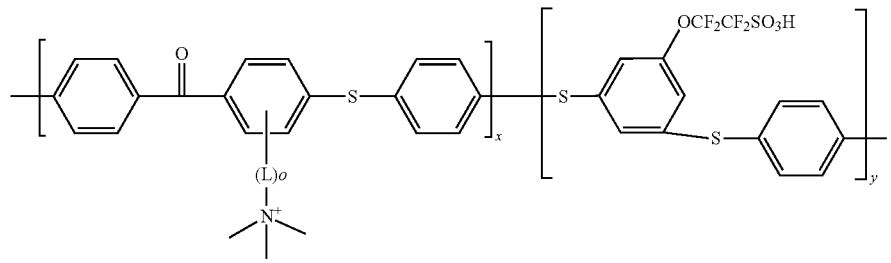
[Chemical Formula D-1]
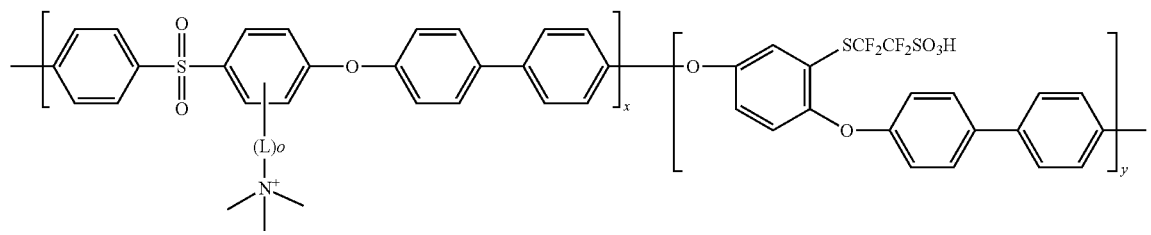
[Chemical Formula E]
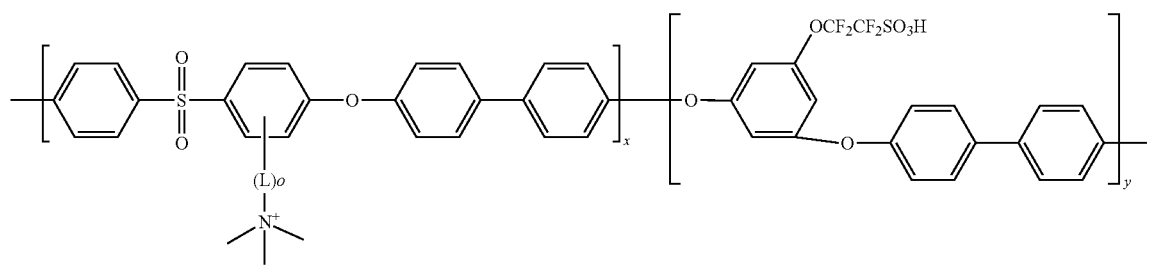
[Chemical Formula E-1]
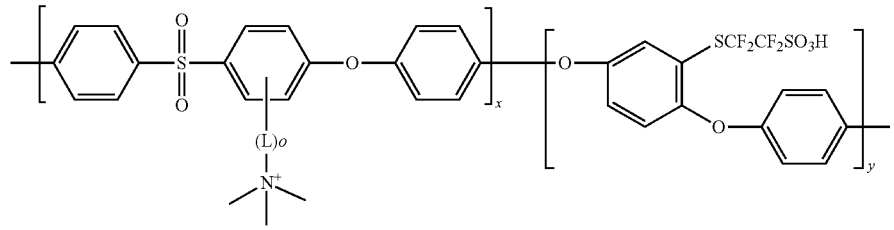
[Chemical Formula F]
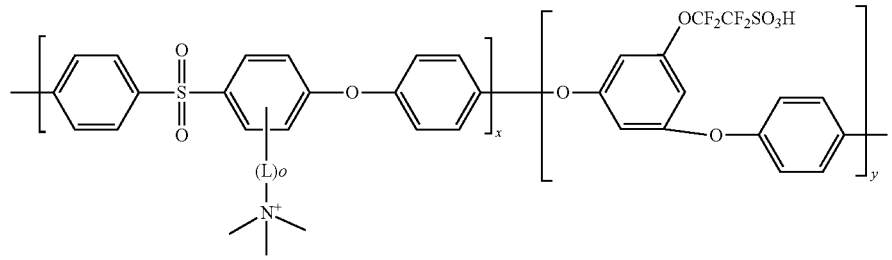
[Chemical Formula F-1]
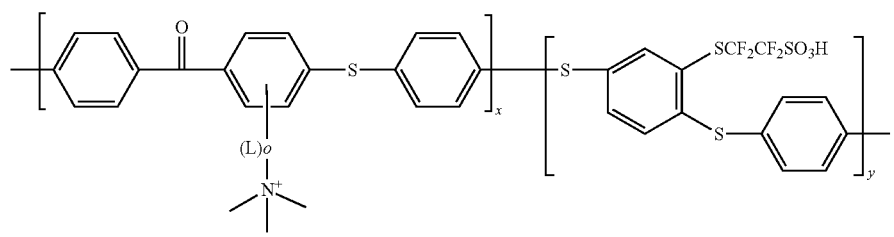
[Chemical Formula G]

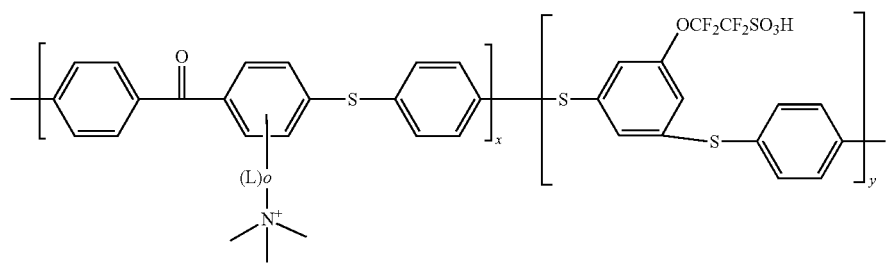
[Chemical Formula G-1]
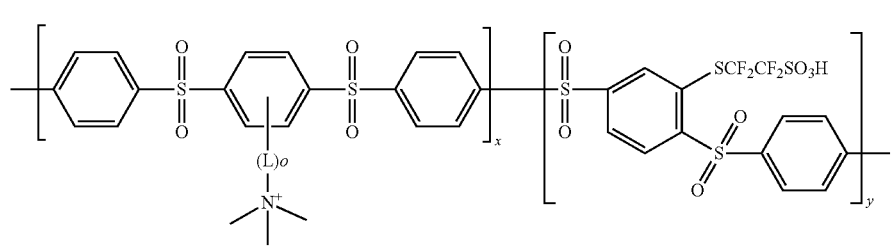
[Chemical Formula H]
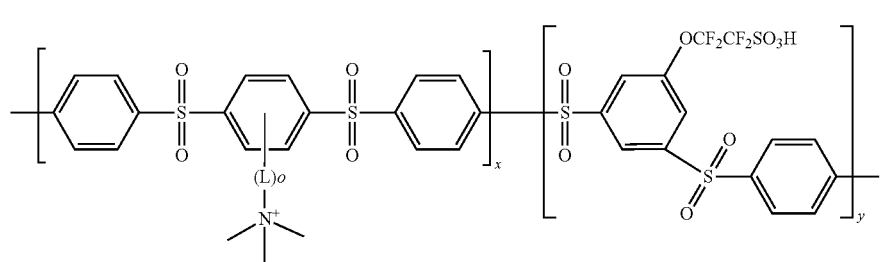
[Chemical Formula H-1]
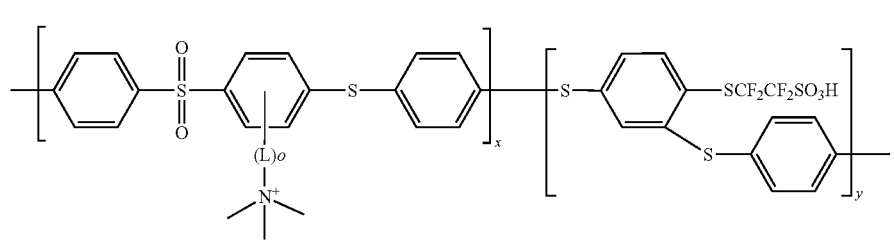
[Chemical Formula I]
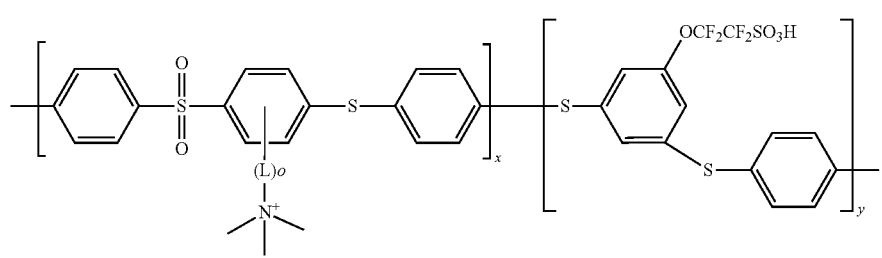
[Chemical Formula I-1]
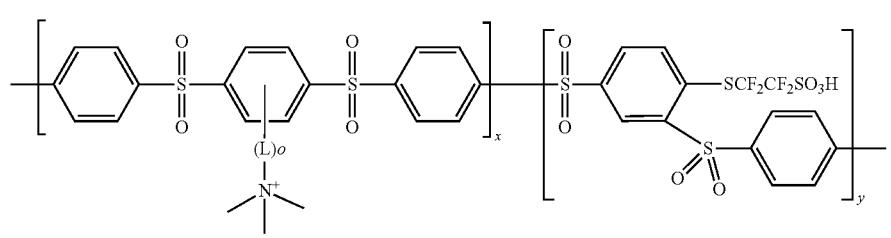
[Chemical Formula J]

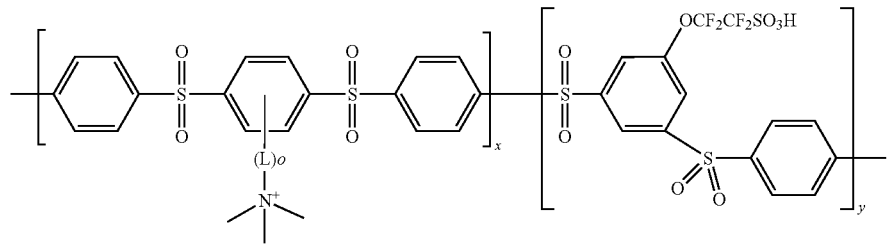

[Chemical Formula J-1]

In Chemical Formulae A to J and A-1 to J-1,
L and o are the same as described above,
x and y are each independently an integer of greater than 0 and less than 1 as a molar ratio of the block polymer, and x+y=1.
In another embodiment,

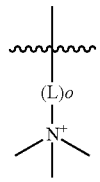

in Chemical Formulae A to H may be substituted with or

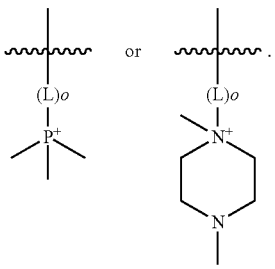

In one embodiment of the present specification, the hydrophilic block and the hydrophobic block are comprised in a molar ratio of 1:0.001 to 1:100 in the block polymer. In one embodiment of the present specification, the hydrophilic block and the hydrophobic block are comprised in a molar ratio of 1:1 to 1:0.001 in the block polymer. In another embodiment, the hydrophilic block and the hydrophobic block are included in a molar ratio of 1:0.1 to 1:0.01 in the block polymer.

In one embodiment of the present specification, the hydrophobic block is preferably comprised in 0.1 mol % to 50 mol % based on all the polymers of the block polymer, and is more preferably comprised in 1 mol % to 10 mol %.

In this case, an ion transfer ability of the block polymer may be enhanced.

In one embodiment of the present specification, the unit represented by Chemical Formula 1 is comprised in the hydrophilic block in 0.01 mol % to 100 mol % based on the hydrophilic block.

In one embodiment of the present specification, the hydrophilic block has a number average molecular weight of 1,000 g/mol to 300,000 g/mol. In a specific embodiment, the number average molecular weight is from 2,000 g/mol to 100,000 g/mol. In another embodiment, the number average molecular weight is from 2,500 g/mol to 50,000 g/mol.

In one embodiment of the present specification, the hydrophobic block has a number average molecular weight of 1,000 g/mol to 300,000 g/mol. In a specific embodiment, the number average molecular weight is from 2,000 g/mol to 100,000 g/mol. In another embodiment, the number average molecular weight is from 2,500 g/mol to 50,000 g/mol.

In one embodiment of the present specification, the block polymer may further comprise a brancher. The brancher in the present specification performs a role of linking or crosslinking polymer chains.

In the block polymer further comprising a brancher in the present specification, the brancher may directly form a main chain of the polymer, and a mechanical degree of integration of a thin membrane may be enhanced. Specifically, in the branched block polymer of the present disclosure, the brancher directly forms a main chain of the polymer without carrying out a post-sulfonation reaction or a cross-linking reaction of a sulfonated polymer by polymerizing branched hydrophobic blocks that do not comprise acid substituents and branched hydrophilic blocks that comprise acid substituents, and the hydrophobic blocks maintaining a mechanical degree of integration of a thin membrane and the hydrophilic blocks providing ion conductivity to the thin membrane are alternately linked through chemical bonds.

In one embodiment of the present specification, the block polymer further comprises a brancher derived from a compound represented by the following Chemical Formula 5; or a brancher represented by the following Chemical Formula 6.

$$Y1-\!\!\left[X\right]_{l}\!\!-Y2$$ [Chemical Formula 5]

 [Chemical Formula 6]

In Chemical Formulae 5 and 6,
X is S; O; CO; SO; $SO_2$; NR""; a hydrocarbon-based or fluorine-based assembly,
R"" is hydrogen; an aromatic ring substituted with a halogen group; or an aliphatic ring substituted with a halogen group,
l is an integer of 0 to 10,
when l is 2 or greater, 2 or more Xs are the same as or different from each other,
Y1 and Y2 are the same as or different from each other, and each independently an aromatic ring in which one, two or more are substituted with substituents selected from the group consisting of a hydroxyl group and a halogen group; or an aliphatic ring in which one, two or more are substituted with substituents selected from the group consisting of a hydroxyl group and a halogen group, and Z is a trivalent organic group.

Examples of the substituents of the present specification are described below, however, the substituents are not limited thereto.

In the present specification,

means bonding to adjacent substituents or a main chain of a polymer.

In the present specification, the "derived" means producing new bonds as bonds of a compound are cut or substituents fall off, and the unit derived from the compound may mean a unit linked to a main chain of a polymer. The unit may form a polymer by being comprised in a main chain of the polymer.

In one embodiment of the present specification, the unit derived from the compound represented by Chemical Formula 1 may mean, when at least two of R1 to R5 are a halogen group, being linked to a main chain of the polymer while the halogen groups fall off. In another embodiment, the unit derived from the compound represented by Chemical Formula 1 may mean, when at least two of R1 to R5 are a hydroxyl group, being linked to a main chain of the polymer by releasing a halogen group of a comonomer having the halogen group.

In one embodiment of the present specification, the unit derived from the compound represented by Chemical Formula 4 may mean E1 and E2 being a thiol group or a hydroxyl group, and the thiol group or the hydroxyl group being linked to a main chain of the polymer while being dehydrogenated. The derived unit may also comprise the meaning of being linked to a main chain of the polymer while being dehydrogenated, and also comprise modifying a site linked to the main chain through post-treatment such as acid treatment and heat treatment.

For example, in one embodiment of the present specification, a linking group of —O— may be provided in the main chain of the polymer when E1 or E2 is a hydroxyl group, and a linking group of —S— may be provided in the main chain of the polymer when E1 and E2 are a thiol group. In addition, as necessary, the linking group of —S— in the main chain of the polymer may be modified to —$SO_2$— through acid treatment.

In addition, specifically, the brancher derived from the compound of Chemical Formula 5 in the present specification may function as a brancher as, in each of Y1 and Y2 that are an aromatic ring substituted with a halogen group; or an aliphatic ring substituted with a halogen group, the halogen group falls off from the aromatic ring or the aliphatic ring. Specifically, the brancher derived from the compound of Chemical Formula 5 in the present specification may function as a brancher in the polymer as two or more halogen groups fall off.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

In the present specification, the hydrocarbon-based means an organic compound formed only with carbon and hydrogen, and comprises linear, branched, cyclic hydrocarbon and the like, but is not limited thereto. In addition, a single bond, a double bond or a triple bond may be comprised, however, the hydrocarbon-based is not limited thereto.

In the present specification, the fluorine-based assembly means a part or all of carbon-hydrogen bonds in the hydrocarbon-based are substituted with fluorine.

In the present specification, the aromatic ring may be an aromatic hydrocarbon ring or an aromatic heteroring, and may be monocyclic or multicyclic.

Specifically, examples of the aromatic hydrocarbon ring may comprise a monocyclic aromatic group such as a phenyl group, a biphenyl group and a terphenyl group, and a multicyclic aromatic group such as a naphthyl group, a binaphthyl group, an anthracenyl group, a phenanthrenyl group, a pyrenyl group, a perylenyl group, a tetracenyl group, a chrysenyl group, a fluorenyl group, an acenaphthacenyl group, a triphenylene group and a fluoranthene group, but are not limited thereto.

In the present specification, the aromatic heteroring means a structure comprising one or more heteroatoms such as O, S, N and Se instead of a carbon atom in the aromatic hydrocarbon ring. Specific examples thereof may comprise a thiophene group, a furan group, a pyrrole group, an imidazole group, a thiazole group, an oxazole group, an oxadiazole group, a triazole group, a pyridyl group, a bipyridyl group, a pyrimidyl group, a triazine group, an acridyl group, a pyridazine group, a pyrazinyl group, a quinolinyl group, a quinazoline group, a quinoxalinyl group, a phthalazinyl group, a pyridopyrimidinyl group, a pyridopyrazinyl group, a pyrazinopyrazinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, a phenanthroline group, a thiazolyl group, an isoxazolyl group, an oxadiazolyl group, a thiadiazolyl group, a benzothiazolyl group, a phenothiazinyl group, a dibenzofuranyl group and the like, but are not limited thereto.

In the present specification, the aliphatic ring may be an aliphatic hydrocarbon ring or an aliphatic heteroring, and may be monocyclic or multicyclic. Examples of the aliphatic ring may comprise a cyclopentyl group, a cyclohexyl group and the like, but are not limited thereto.

In the present specification, the organic group may comprise an alkyl group, an alkenyl group, a cycloalkyl group, a cycloalkenyl group, an aryl group, an aralkyl group and the like. This organic group may comprise bonds or substituents other than a hydrocarbon group such as heteroatoms in the organic group. In addition, the organic group may be any of linear, branched or cyclic.

In the present specification, the trivalent organic group means a trivalent group having 3 bonding sites in an organic compound.

In addition, the organic group may form a cyclic structure, and may form bonds comprising heteroatoms as long as it does not harm effects of the present disclosure.

Specifically, bonds comprising heteroatoms such as an oxygen atom, a nitrogen atom and a silicon atom may be comprised. Specific examples thereof may comprise ether bonds, thioether bonds, carbonyl bonds, thiocarbonyl bonds, ester bonds, amide bonds, urethane bonds, imino bonds (—N═C(-A)-, —C(═NA)-: A represents a hydrogen atom or an organic group), carbonate bonds, sulfonyl bonds, sulfinyl bonds, azo bonds and the like, but are not limited thereto.

Examples of the cyclic structure may comprise the aromatic ring and the aliphatic ring described above, and the like, and the cyclic structure may be monocyclic or multicyclic.

In the present specification, the alkyl group may be linear or branched, and although not particularly limited thereto, the number of carbon atoms is preferably from 1 to 50. Specific examples thereof may comprise a methyl group, an ethyl group, a propyl group, an isopropyl group, a butyl group, a t-butyl group, a pentyl group, a hexyl group, a heptyl group and the like, but are not limited thereto.

In the present specification, the alkenyl group may be linear or branched, and although not particularly limited thereto, the number of carbon atoms is preferably from 2 to 40. Specific examples thereof may comprise vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group and the like, but are not limited thereto.

In the present specification, the cycloalkyl group is not particularly limited, but preferably has 3 to 60 carbon atoms, and particularly, may comprise a cyclopentyl group, a cyclohexyl group and the like, but is not limited thereto.

In one embodiment of the present specification, l is 3 or greater.

In one embodiment of the present specification, X is S.

In another embodiment, X is a haloalkyl group.

In another embodiment, X is $CH_2$.

In another embodiment of the present specification, X is $NR'''$.

In one embodiment of the present specification, Y1 and Y2 are the same as or different from each other, and each independently a halogen-substituted aromatic ring.

In one embodiment of the present specification, Y1 and Y2 are the same as or different from each other, and each independently a fluorine-substituted aromatic hydrocarbon ring.

In another embodiment, Y1 and Y2 are each a fluorine-substituted phenyl group. Specifically, 2,4-phenyl, 2,6-phenyl, 2,3-phenyl, 3,4-phenyl and the like are comprised, however, Y1 and Y2 are not limited thereto.

In one embodiment of the present specification, the compound represented by Chemical Formula 5 may be represented by any one of the following structures.

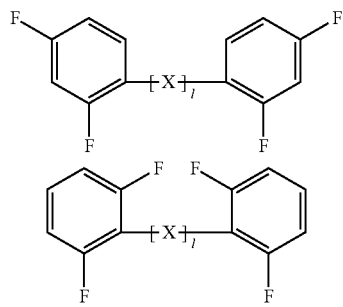

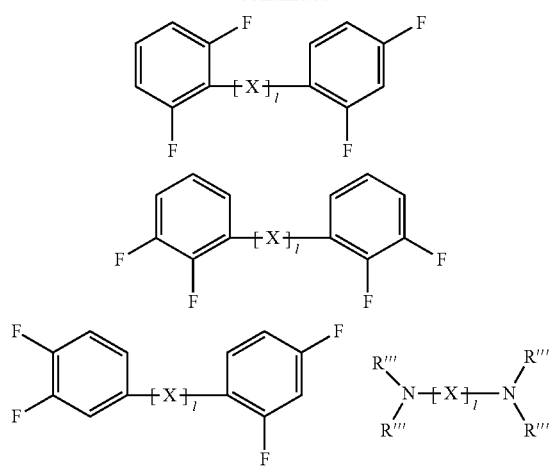

In the structures, X, l and R''' have the same definitions as in Chemical Formula 5.

According to one embodiment of the present specification, Z in Chemical Formula 6 may be represented by any one of the following Chemical Formulae 6-1 to 6-4.

[Chemical Formula 6-1]

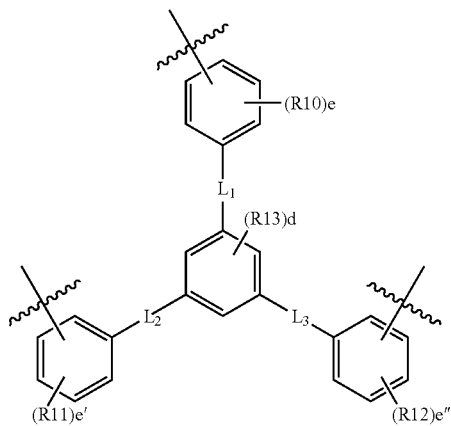

[Chemical Formula 6-2]

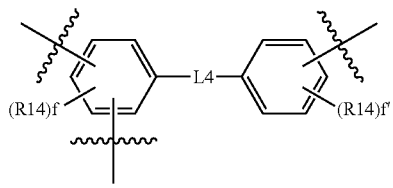

[Chemical Formula 6-3]

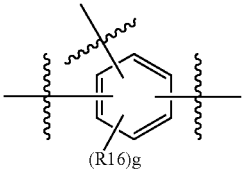

[Chemical Formula 6-4]

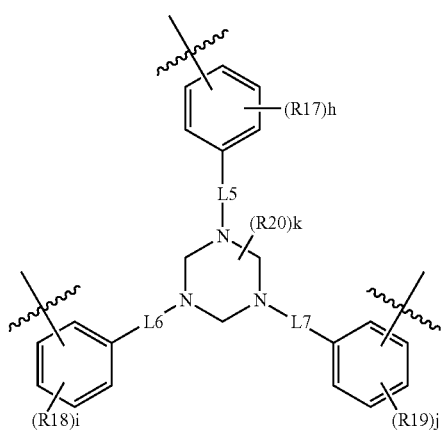

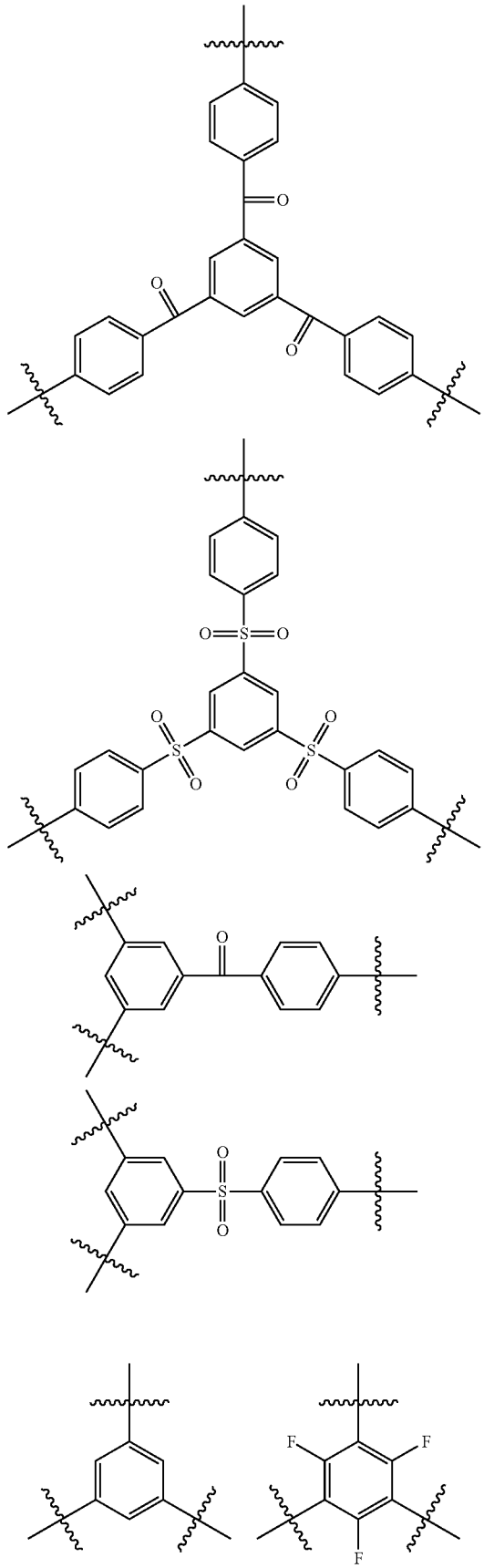

In Chemical Formulae 6-1 to 6-4,

L1 to L7 are the same as or different from each other, and each independently a direct bond; —S—; —O—; —CO—; or —SO$_2$—, R10 to R20 are the same as or different from each other, and each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted aryl group; or a substituted or unsubstituted heteroaryl group, e, e', e'', f, h, i and j are each an integer of 1 to 4, d, f, g and k are each an integer of 1 to 3, and when d, e, e', e'', f, f', g, h, i, j and k are each an integer of 2 or greater, structures in the two or more parentheses are the same as or different from each other.

In one embodiment of the present specification, L1 is CO.

In another embodiment, L1 is SO$_2$.

In another embodiment, L1 is S.

In another embodiment, L2 is CO.

In another embodiment, L2 is SO$_2$.

In another embodiment, L2 is S.

In one embodiment of the present specification, L3 is CO.

In another embodiment, L3 is SO$_2$.

In another embodiment, L3 is S.

In one embodiment of the present specification, L4 is CO.

In another embodiment, L4 is SO$_2$.

In one embodiment of the present specification, L5 is a direct bond.

In another embodiment, L6 is a direct bond.

In another embodiment, L7 is a direct bond.

In one embodiment of the present specification, R10 to R20 are hydrogen.

In one embodiment of the present specification, R16 is a halogen group.

In another embodiment, R16 is fluorine.

In addition, in one embodiment of the present specification, the brancher represented by Chemical Formula 6 may be represented by any one of the following structures.

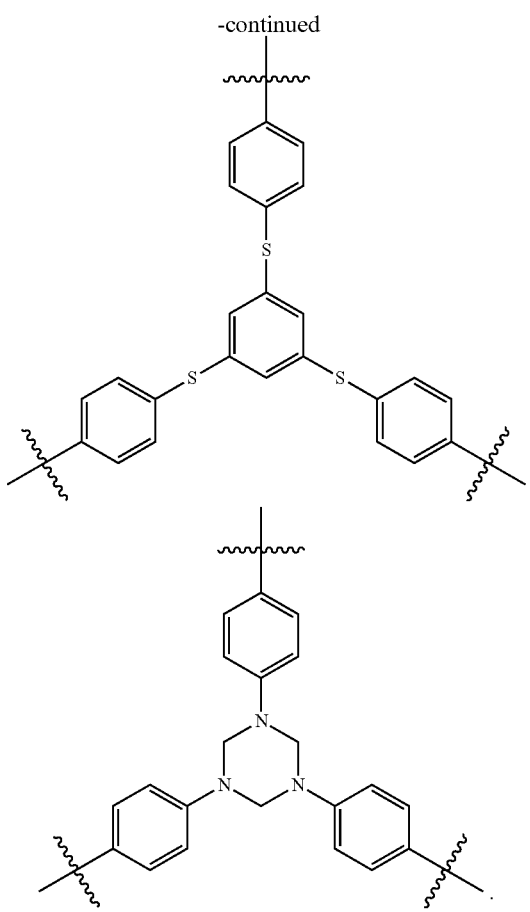

In one embodiment of the present specification, the polymer has a weight average molecular weight of 500 g/mol to 5,000,000 g/mol. In another embodiment of the present specification, the polymer has a weight average molecular weight of 10,000 g/mol to 3,000,000 g/mol. When the polymer has a weight average molecular weight in the above-mentioned range, mechanical properties of an electrolyte membrane comprising the polymer do not decline, and proper polymer solubility is maintained, and therefore, the electrolyte membrane may be readily prepared.

In addition, one embodiment of the present specification provides a polymer electrolyte membrane comprising the block polymer described above.

When comprising the block polymer comprising the unit represented by Chemical Formula 1 according to one embodiment of the present specification, high mechanical strength and high ion conductivity are obtained, and phase separation of the electrolyte membrane may be readily accomplished.

In the present specification, the "electrolyte membrane" is a membrane capable of exchanging ions, and comprises a membrane, an ion-exchange membrane, an ion-transfer membrane, an ion-conductive membrane, a separator, an ion-exchange separator, an ion-transfer separator, an ion-conductive separator, an ion-exchange electrolyte membrane, an ion-transfer electrolyte membrane, an ion-conductive electrolyte membrane or the like.

The polymer electrolyte membrane according to one embodiment of the present specification may be prepared using materials and/or methods known in the art except for comprising a block polymer comprising a hydrophilic block comprising the unit represented by Chemical Formula 1; and a hydrophobic block comprising at least one cationic side chain.

According to one embodiment of the present specification, the polymer electrolyte membrane has ion conductivity of greater than or equal to 0.01 S/cm and less than or equal to 0.5 S/cm. In another embodiment, the polymer electrolyte membrane has ion conductivity of greater than or equal to 0.01 S/cm and less than or equal to 0.3 S/cm.

In one embodiment of the present specification, ion conductivity of the polymer electrolyte membrane may be measured under a humidity condition. A humidity condition in the present specification may mean relative humidity (RH) of 10% to 100%.

In addition, in one embodiment of the present specification, the polymer electrolyte membrane has an ion exchange capacity (IEC) value of 0.01 mmol/g to 5 mmol/g. When the polymer electrolyte membrane has an ion exchange capacity value in the above-mentioned range, ion channels are formed in the polymer electrolyte membrane, and the polymer may exhibit ion conductivity.

In one embodiment of the present specification, the polymer electrolyte membrane has a thickness of 1 μm to 500 μm. The polymer electrolyte membrane having the above-mentioned thickness range reduces electric short and electrolyte material crossover, and may exhibit an excellent cation conductivity property.

One embodiment of the present specification also provides a membrane-electrode assembly comprising an anode; a cathode; and the polymer electrolyte membrane described above provided between the anode and the cathode.

The membrane-electrode assembly (MEA) means an assembly of electrodes (cathode and anode) where an electrochemical catalyst reaction of fuel and air occurs and a polymer membrane in which hydrogen ion transfer occurs, and is a single assembled unit where electrodes (cathode and anode) and an electrolyte membrane are adhered.

The membrane-electrode assembly of the present specification has a form of a catalyst layer of an anode and a catalyst layer of a cathode being brought into contact with an electrolyte membrane, and may be prepared using common methods known in the art. As one example, the membrane-electrode assembly may be prepared through thermocompressing the cathode; the anode; and the electrolyte membrane located between the cathode and the anode at 100° C. to 400° C. while sticking these together.

The anode electrode may comprise an anode catalyst layer and an anode gas diffusion layer. The anode gas diffusion layer may again comprise an anode micropore layer and an anode electrode substrate.

The cathode electrode may comprise a cathode catalyst layer and a cathode gas diffusion layer. The cathode gas diffusion layer may again comprise a cathode micropore layer and a cathode electrode substrate.

FIG. 1 is a diagram schematically showing a principle of electricity generation of a fuel cell, and in the fuel cell, a most basic unit generating electricity is a membrane-electrode assembly (MEA), and this is formed with an electrolyte membrane (100), and anode (200a) and cathode (200b) electrodes formed on both sides of the electrolyte membrane (100). When referring to FIG. 1 showing a principle of electricity generation of a fuel cell, an oxidation reaction of fuel such as hydrogen, methanol, or hydrocarbon such as butane occurs in the anode (200a) to generate hydrogen ions (H$^+$) and electrons (e$^-$), and the hydrogen ions migrate to the cathode (200b) through the electrolyte membrane (100). In the cathode (200b), water is produced through the reaction of the hydrogen ions transferred through the electrolyte membrane (100), an oxidizer such as oxygen, and electrons. Electrons migrate to an external circuit through such a reaction.

The anode electrode catalyst layer is a place where an oxidation reaction of fuel occurs, and catalysts selected from the group consisting of platinum, ruthenium, osmium, platinum-ruthenium alloys, platinum-osmium alloys, platinum-palladium alloys and platinum-transition metal alloys may be preferably used. The cathode electrode catalyst layer is a place where a reduction reaction of an oxidizer occurs, and platinum or platinum-transition metal alloys may be preferably used as catalysts. The catalysts may be used as they are, or may be used while being supported on a carbon-based carrier.

The process of introducing the catalyst layer may be carried out using common methods known in the art, and for example, a catalyst ink may be directly coated on the electrolyte membrane, or coated on the gas diffusion layer to form the catalyst layer. Herein, the coating method of the catalyst ink is not particularly limited, and methods of spray coating, tape casting, screen printing, blade coating, die coating, spin coating or the like may be used. The catalyst ink may be typically formed with a catalyst, a polymer ionomer and a solvent.

The gas diffusion layer becomes a migration path of reaction gases and water while performing a role of a current conductor, and has a porous structure. Accordingly, the gas diffusion layer may be formed comprising a conductive substrate. As the conductive substrate, carbon paper, carbon cloth or carbon felt may be preferably used. The gas diffusion layer may be formed further comprising a micropore layer between the catalyst layer and the conductive substrate. The micropore layer may be used for enhancing fuel cell performance under a low humidity condition, and performs a role of allowing the electrolyte membrane to be under a sufficiently wet condition by having the amount of water escaping outside the gas diffusion layer being small.

One embodiment of the present specification provides a polymer electrolyte-type fuel cell comprising two or more membrane-electrode assemblies; a stack comprising a bipolar plate provided between the membrane-electrode assemblies; a fuel supplying unit supplying fuel to the stack; and an oxidizer supplying unit supplying an oxidizer to the stack.

A fuel cell is an energy conversion device directly converting chemical energy of fuel into electric energy. In other words, a fuel cell employs a power generation method utilizing a fuel gas and an oxidizer, and using electrons generated during the oxidation and reduction reactions thereof to produce power.

The fuel cell may be manufactured through common methods known in the art using the membrane-electrode assembly (MEA) described above. For example, the fuel cell may be manufactured by forming with the membrane-electrode assembly (MEA) prepared above and a bipolar plate.

The fuel cell of the present specification is formed comprising a stack, a fuel supplying unit and an oxidizer supplying unit.

FIG. 3 is a diagram schematically illustrating the fuel cell, and the fuel cell is formed comprising a stack (60), an oxidizer supplying unit (70) and a fuel supplying unit (80).

The stack (60) comprises one, two or more of the membrane-electrode assemblies described above, and when two or more of the membrane-electrode assemblies are comprised, a separator provided therebetween is comprised. The separator prevents the membrane-electrode assemblies from being electrically connected, and performs a role of transferring fuel and oxidizer supplied from the outside to the membrane-electrode assemblies.

The oxidizer supplying unit (70) performs a role of supplying an oxidizer to the stack (60). As the oxidizer, oxygen is typically used, and oxygen or air may be injected with a pump (70) to be used.

The fuel supplying unit (80) performs a role supplying fuel to the stack (60), and may be formed with a fuel tank (81) storing fuel, and a pump (82) supplying the fuel stored in the fuel tank (81) to the stack (60). As the fuel, hydrogen or hydrocarbon fuel in a gas or liquid state may be used. Examples of the hydrocarbon fuel may comprise methanol, ethanol, propanol, butanol or natural gas.

The fuel cell may comprise a polymer electrolyte fuel cell, a direct liquid fuel cell, a direct methanol fuel cell, a direct formic acid fuel cell, a direct ethanol fuel cell, a direct dimethyl ether fuel cell or the like.

When using the electrolyte membrane according to one embodiment of the present specification as an ion-exchange membrane of the fuel cell, effects described above may be obtained.

In addition, one embodiment of the present specification provides a redox flow battery comprising a positive electrode cell comprising a positive electrode and a positive electrode liquid electrolyte; a negative electrode cell comprising a negative electrode and a negative electrode liquid electrolyte; and the polymer electrolyte membrane according to one embodiment of the present specification provided between the positive electrode cell and the negative electrode cell.

A redox flow battery (oxidation-reduction flow battery) is a system charged and discharged by active materials comprised in a liquid electrolyte being oxidized and reduced, and is an electrochemical storage device directly storing chemical energy of the active materials as electric energy. A redox flow battery uses a principle of being charged and discharged from the exchange of electrons occurring when liquid electrolytes comprising active materials in different oxidation states meet with an ion-exchange membrane in between. A redox flow battery is generally formed with a tank holding a liquid electrolyte, a battery cell where charge and discharge occur, and a circulating pump for circulating the liquid electrolyte between the tank and the battery cell, and a unit cell of the battery cell comprises an electrode, an electrolyte and an ion-exchange membrane.

When using the electrolyte membrane according to one embodiment of the present specification as an ion-exchange membrane of the redox flow battery, effects described above may be obtained.

The redox flow battery of the present specification may be manufactured using common methods known in the art except for comprising the polymer electrolyte membrane according to one embodiment of the present specification.

As illustrated in FIG. 2, the redox flow battery is divided into a positive electrode cell (32) and a negative electrode cell (33) by an electrolyte membrane (31). The positive electrode cell (32) and the negative electrode cell (33) comprise a positive electrode and a negative electrode, respectively. The positive electrode cell (32) is connected to a positive electrode tank (10) for supplying and releasing a positive electrode liquid electrolyte (41) through a pipe. The negative electrode cell (33) is also connected to a negative electrode tank (20) for supplying and releasing a negative electrode liquid electrolyte (42) through a pipe. The liquid electrolytes circulate through pumps (11, 21), and through an oxidation/reduction reaction (that is, a redox reaction)

changing the oxidation number of ions, charge and discharge occur in the positive electrode and the negative electrode.

Hereinafter, the present specification will be described in detail with reference to examples. However, the examples according to the present specification may be modified to various other forms, and the scope of the present specification is not to be construed as being limited to the examples described below. Examples of the present specification are provided in order to more completely describe the present specification to those having average knowledge in the art.

PREPARATION EXAMPLE

Preparation Example 1. Synthesis of Compound A

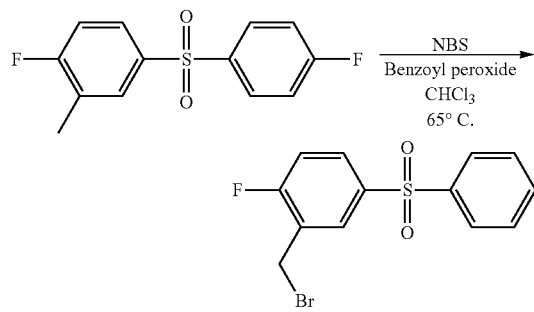

After dissolving 200 g (0.75 mol) of 1-fluoro-4-((4-fluorophenyl)sulfonyl)-2-methylbenzene in 1500 ml of chloroform, 18.1 g (74.5 mmol) of benzoyl peroxide was added thereto. After 398 g (2.24 mol) of N-bromosuccinimide was slowly added dropwise thereto, the temperature of the reactant was raised to 65° C., and the reactant was stirred for 5 hours at the same temperature. After the reaction was terminated, the reactant was cooled to room temperature, diluted with ethyl acetate, and then washed several times using a saturated aqueous $NaHCO_3$ solution. The organic layer obtained as above was dried using magnesium sulfate ($MgSO_4$), and the result was distilled to obtain Compound A [2-(bromomethyl)-1-fluoro-4-((4-fluorophenyl)sulfonyl) benzene] in a crude state. The crude compound obtained as above was used in a next reaction without additional separation and purification processes.

Preparation Example 2. Synthesis of Compound B

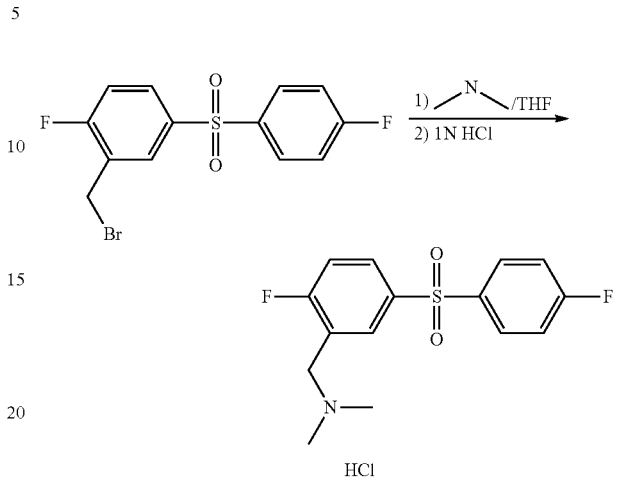

After dissolving Compound A [2-(bromomethyl)-1-fluoro-4-((4-fluorophenyl)sulfonyl)benzene] obtained in Preparation Example 1 in 1500 ml of THF, the reactant was cooled to 0° C., and 420 g (3.73 mol) of dimethylamine (40 wt % in $H_2O$) was slowly added dropwise thereto. The temperature of the reactant was slowly raised to room temperature, and the reactant was stirred for 4 hours at room temperature. The solvent was removed by vacuum distillation, the result was diluted with ethyl acetate, and 1 N HCl was added dropwise thereto. The aqueous layer obtained as above was washed several times with ethyl acetate to remove impurities, and the acidic aqueous layer was vacuum distilled to obtain a solid compound in a HCl salt form. The solid compound obtained as above was placed in methylene chloride, the result was stirred at room temperature in a slurry state, filtered, and dried under $N_2$ gas to obtain a high purity final Compound B [1-(2-fluoro-5-((4-fluorophenyl)sulfonyl)phenyl)-N,N-dimethylmethanamine hydrochloride] in a 42% yield (2 step yield). A H-NMR spectrum of Compound B is shown in FIG. 4.

Preparation Example 3. Synthesis of Intermediate 1

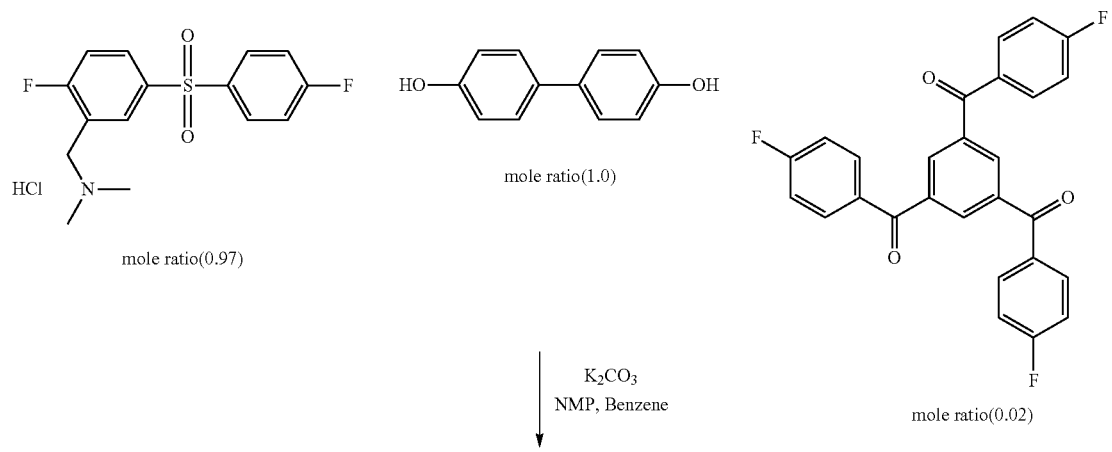

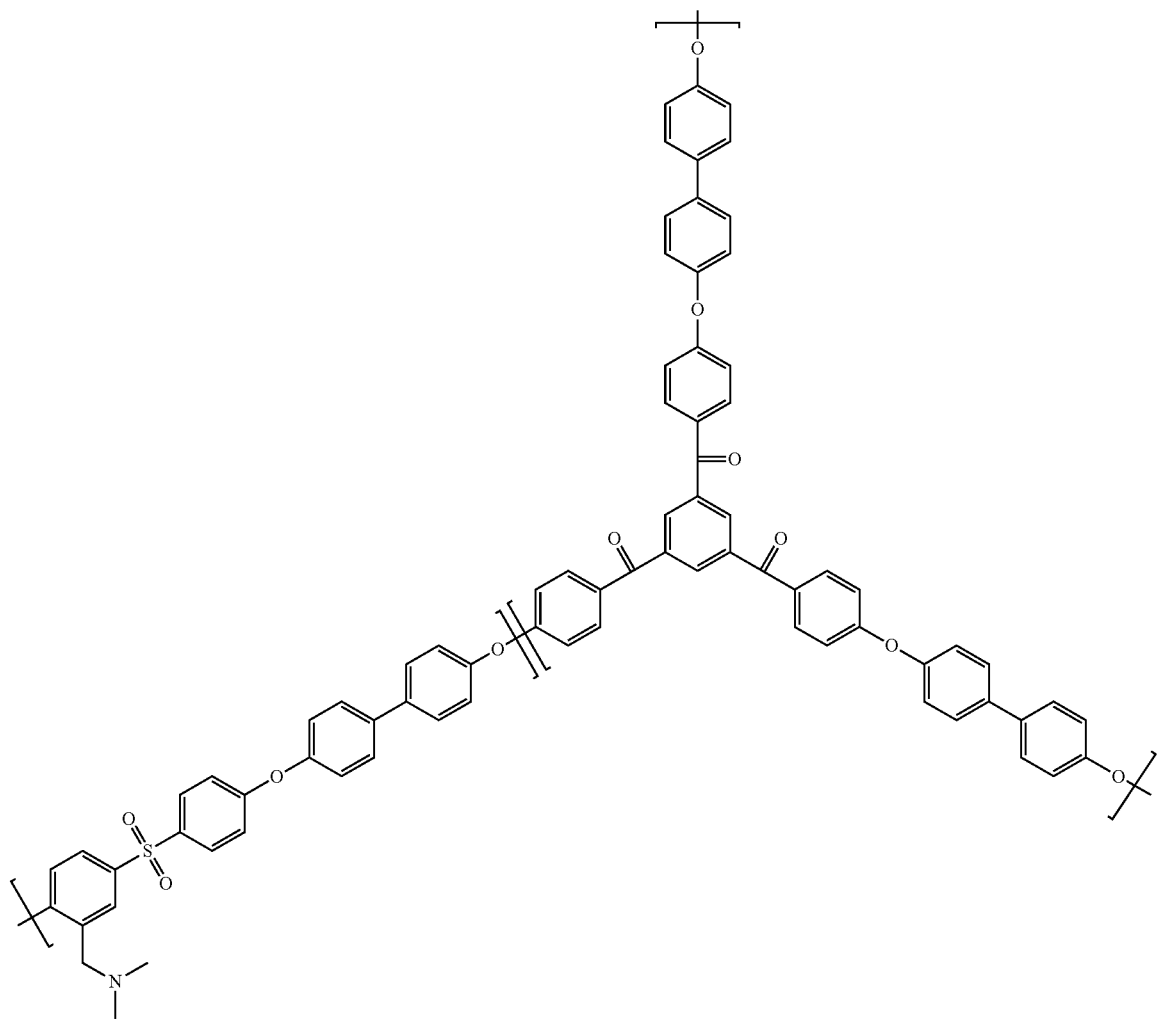
Each of the monomers and potassium carbonate ($K_2CO_3$: molar ratio 4) were mixed in a 30 wt % ratio of NMP and a 20 wt % ratio of benzene, and the result was polymerized for 4 hours at 140° C. and for 16 hours at 180° C. to prepare the polymer. H-NMR of the polymer is shown in FIG. 5. The H-NMR test was progressed in a $CDCl_3$ solvent after dissolving Polymer 1 in DMAC.

Preparation Example 4, Synthesis of Intermediate 2
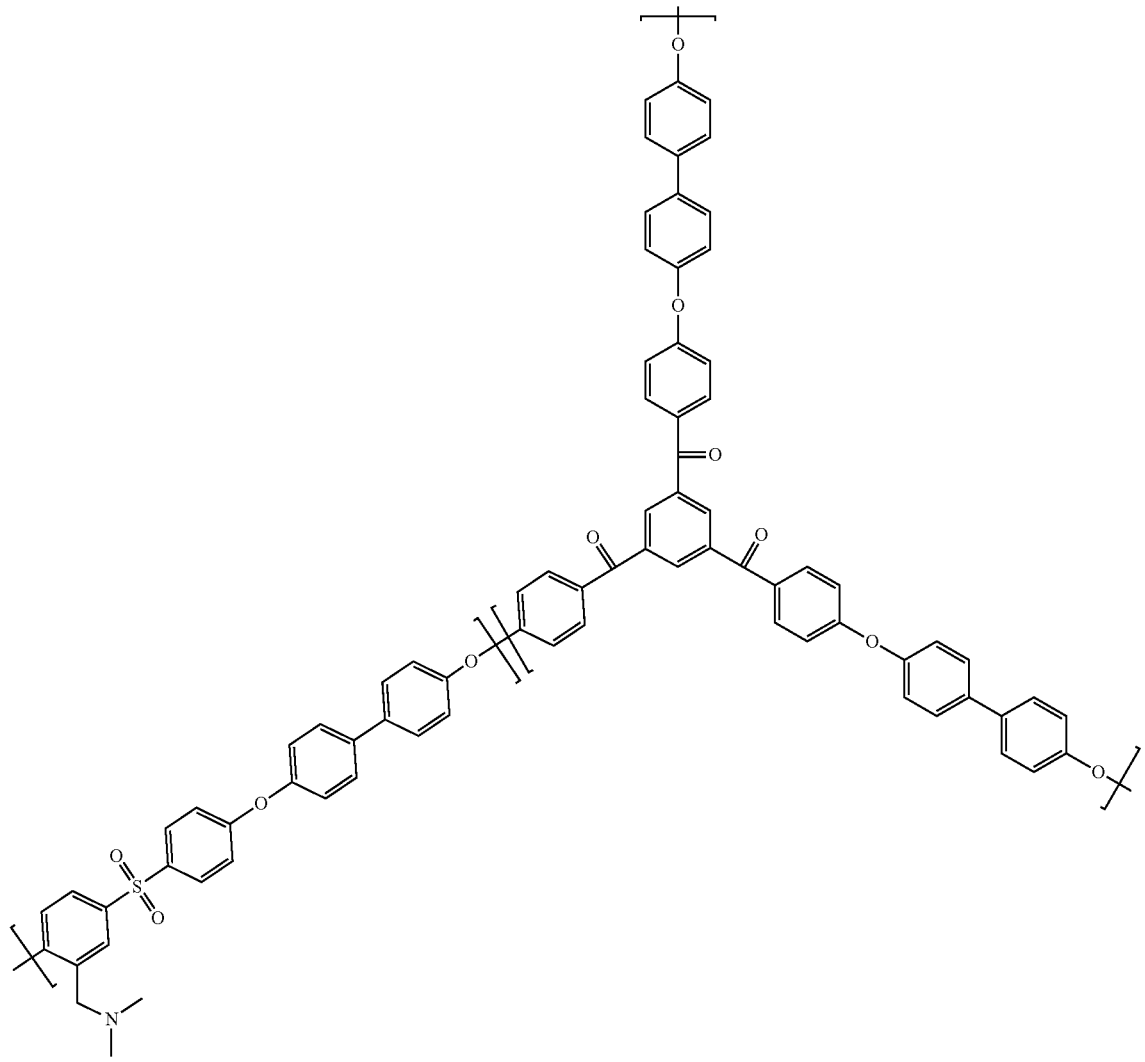
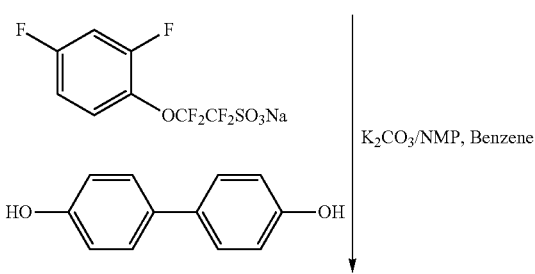
K₂CO₃/NMP, Benzene -continued

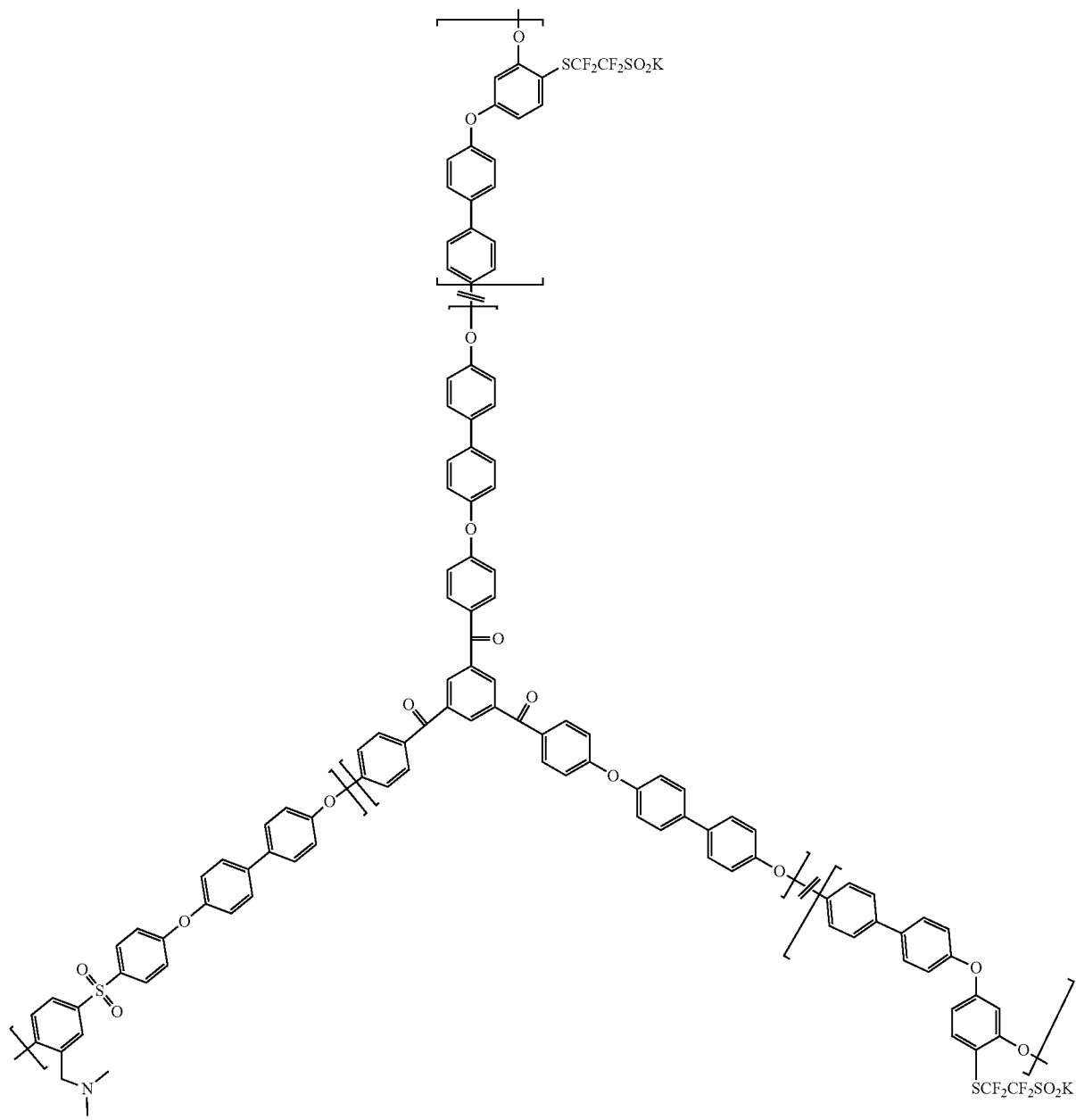

To the polymer synthesized in Preparation Example 3, each of the monomers and potassium carbonate ($K_2CO_3$: molar ratio 4) were mixed in a 30 wt % ratio of NMP and a 20 wt % ratio of benzene, and the result was polymerized for 4 hours at 140° C. and for 16 hours at 180° C. to prepare Polymer 2.

Preparation Example 5. Synthesis of Compound 1

After dissolving Intermediate 2 obtained in Preparation Example 4 in DMAC in a concentration of 5 wt %, 5 eq. of methyl iodide was added thereto, and the result was reacted for 6 hours at room temperature to finally prepare the following Compound 1.

[Compound 1]

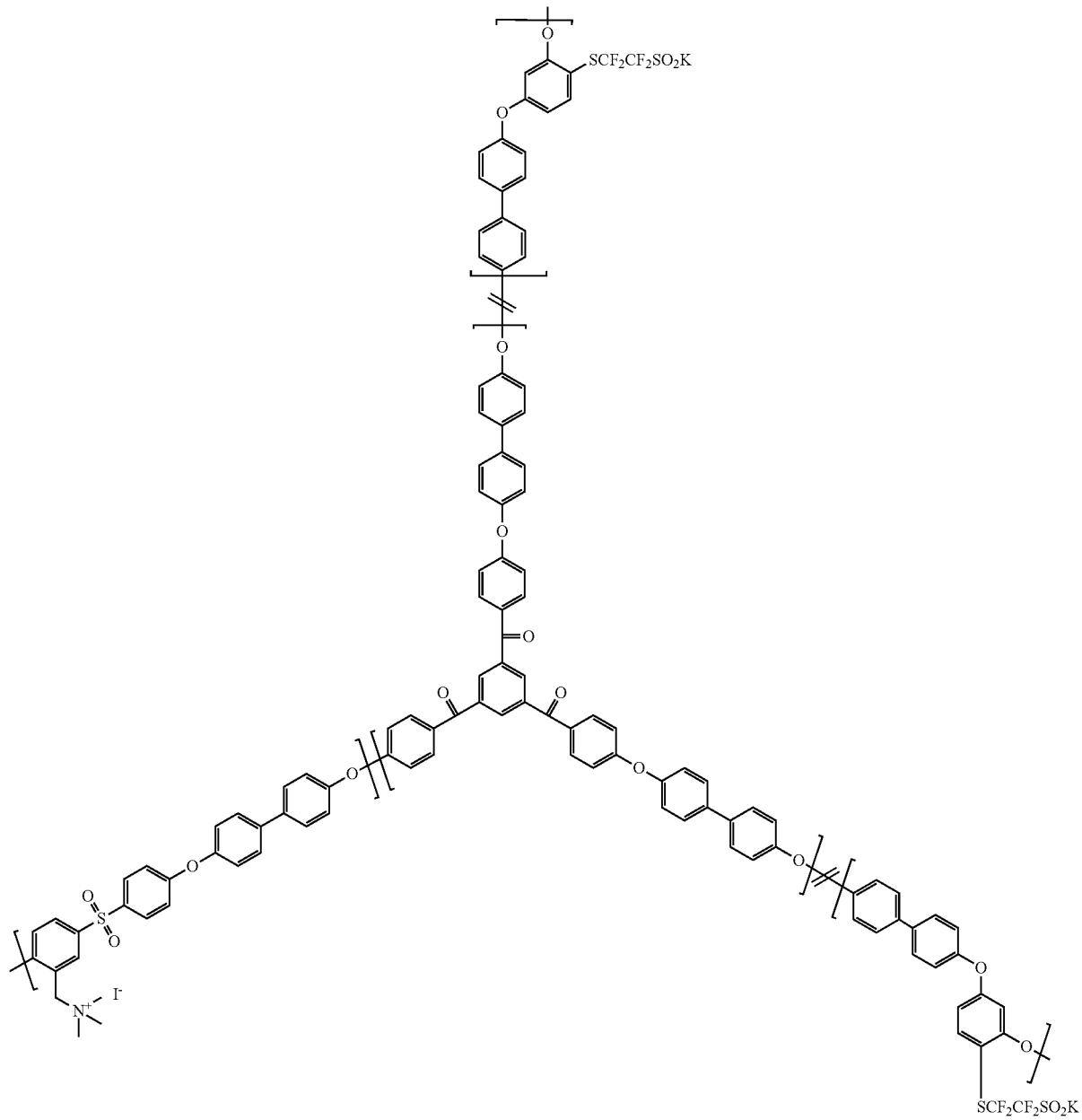

Example 1

Vanadium permeability of the electrolyte membrane using Compound 1 was measured and shown in the following Table 1.

Comparative Example 1

Vanadium permeability of the electrolyte membrane using Nafion 115 was measured and shown in the following Table 1.

TABLE 1

| Example/Comparative Example | $VO^{2+}$ Permeability $(cm^2/min) \times 10^{-6}$ |
|---|---|
| Example 1 | 0.5 |
| Comparative Example 1 | 5.84 |

The vanadium ion permeability is a value obtained by, after charging a 1 M $VOSO_4$ in 2 M $H_2SO_4$ solution on one side, charging a 1 M $MgSO_4$ in 2 M $H_2SO_4$ solution on the other side, and installing an electrolyte membrane between the two solutions, measuring a $VO^{2+}$ concentration in the 1 M $MgSO_4$ in 2 M $H_2SO_4$ solution depending on time.

The active area was 7.69 $cm^2$, the volume was 200 ml, and the measurement was made at room temperature.

When compared to a Nafion 115 electrolyte membrane, it was seen that the electrolyte membrane comprising Compound 1 had greatly reduced vanadium ion permeability compared to the existing Nafion electrolyte membrane since a cationic functional group was present in the electrolyte membrane main chain. As a result, it may be predicted that performance of the electrolyte membrane comprising the copolymer according to one embodiment of the present disclosure is excellent since a vanadium ion crossover is capable of being effectively suppressed.

Accordingly, battery efficiency may be enhanced when manufacturing a fuel cell or a redox flow battery using the electrolyte membrane according to the present specification.

The invention claimed is:

1. A block polymer comprising:
a hydrophobic block; and
a hydrophilic block,
wherein the hydrophobic block comprises at least one cationic side chain, and
the hydrophilic block comprises a unit derived from a compound represented by the following Chemical Formula 1:

[Chemical Formula 1]

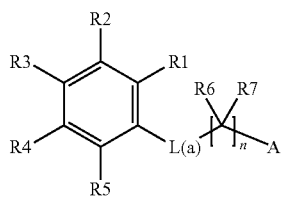

wherein, in Chemical Formula 1,
A is —SO$_3$H, —SO$_3^-$M$^+$, —COOH, —COO$^-$M$^+$, —PO$_3$H$_2$, —PO$_3$H$^-$M$^+$, —PO$_3^{2-}$2M$^+$, —O(CF$_2$)$_m$SO$_3$H, —O(CF$_2$)$_m$SO$_3^-$M$^+$, —O(CF$_2$)$_m$COOH, —O(CF$_2$)$_m$COO$^-$M$^+$, —O(CF$_2$)$_m$PO$_3$H$_2$, —O(CF$_2$)$_m$PO$_3$H$^-$M$^+$ or —O(CF$_2$)$_m$PO$_3^{2-}$2M$^+$;
m is an integer of 2 to 6;
M is a group 1 element;
R1 to R5 are the same as or different from each other, and each independently hydrogen; a halogen group; or a hydroxyl group;
at least two of R1 to R5 are a halogen group; or a hydroxyl group;
R6 and R7 are the same as or different from each other, and each independently a halogen group;
L(a) is a direct bond; S; O; NRa; SO$_2$; or a substituted or unsubstituted alkylene group having 1 to 10 carbon atoms;
Ra is hydrogen; or a substituted or unsubstituted alkyl group; and
n is an integer of 2 to 10, and structures in the 2 to 10 parentheses are the same as or different from each other,
wherein the hydrophobic block comprises a unit represented by the following Chemical Formula 2 or Chemical Formula 3:

[Chemical Formula 2]

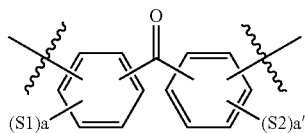

[Chemical Formula 3]

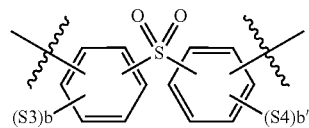

wherein, in Chemical Formula 2 and Chemical Formula 3,
S1 to S4 are the same as or different from each other, and each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L)o-N$^+$RR'R''; -(L)o-P$^+$RR'R''; or the following Chemical Formula 1-A;

[Chemical Formula 1-A]

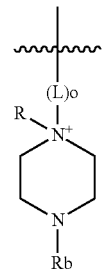

L is a direct bond; O; NR'''; S; or a substituted or unsubstituted alkylene group having 1 to 10 carbon atoms;
o is an integer of 1 to 10;
when o is 2 or greater, two or more Ls are the same as or different from each other;
R, R', R'', R' and Rb are the same as or different from each other, and each independently hydrogen; or a substituted or unsubstituted alkyl group having 1 to 10 carbon atoms:
a, a', b and b' are each an integer of 1 to 4; and
when a, a', b and b' are each an integer of 2 or greater, structures in the two or more parentheses are the same as or different from each other.

2. The block polymer of claim 1, wherein the cationic side chain is -(L)o-N$^+$RR'R''; -(L)o-P$^+$RR'R''; or the following Chemical Formula 1-A:

[Chemical Formula 1-A]

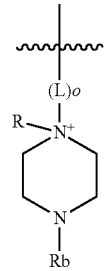

L is a direct bond; O; NR'''; S; SO$_2$; or a substituted or unsubstituted alkylene group having 1 to 10 carbon atoms;

o is an integer of 1 to 10;

when o is 2 or greater, two or more Ls are the same as or different from each other; and R, R', R'', R''' and Rb are the same as or different from each other, and each independently hydrogen; or a substituted or unsubstituted alkyl group having 1 to 10 carbon atoms.

3. The block polymer of claim 1, wherein the hydrophobic block or the hydrophilic block further comprises a unit derived from a compound represented by the following Chemical Formula 4:

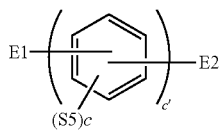

[Chemical Formula 4]

wherein, in Chemical Formula 4,

E1 and E2 are a hydroxyl group or a thiol group;

S5 is hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L)o-N$^+$RR'R''; -(L)o-P$^+$RR'R''; or the following Chemical Formula 1-A;

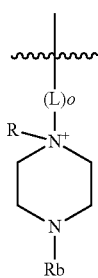

[Chemical Formula 1-A]

L is a direct bond; O; NR'''; S; or a substituted or unsubstituted alkylene group having 1 to 10 carbon atoms;

o is an integer of 1 to 10;

when o is 2 or greater, two or more Ls are the same as or different from each other;

R, R', R'', R' and Rb are the same as or different from each other, and each independently hydrogen; or a substituted or unsubstituted alkyl group having 1 to 10 carbon atoms;

c is an integer of 1 to 4;

c' is an integer of 1 to 3; and when c and c' are each an integer of 2 or greater, structures in the two or more parentheses are the same as or different from each other.

4. The block polymer of claim 1, wherein the hydrophobic block further comprises a unit derived from a compound represented by the following Chemical Formula 4:

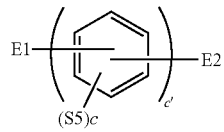

[Chemical Formula 4]

in Chemical Formulae 2 to 4,

E1 and E2 are a hydroxyl group or a thiol group;

each S5 is the same as or different from each other, and each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L)o-N$^+$RR'R''; -(L)o-P$^+$RR'R''; or the following Chemical Formula 1-A;

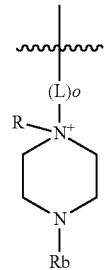

[Chemical Formula 1-A]

L is a direct bond; O; NR'''; S; or a substituted or unsubstituted alkylene group having 1 to 10 carbon atoms;

o is an integer of 1 to 10;

when o is 2 or greater, two or more Ls are the same as or different from each other;

R, R', R'', R''' and Rb are the same as or different from each other, and each independently hydrogen; or a substituted or unsubstituted alkyl group having 1 to 10 carbon atoms;

a, a', b, b' and c are each an integer of 1 to 4;

c' is an integer of 1 to 3; and when a, a', b, b', c and c' are each an integer of 2 or greater, structures in the two or more parentheses are the same as or different from each other.

5. The block polymer of claim 1, wherein the unit derived from the compound represented by Chemical Formula 1 is represented by any one of the following Chemical Formulae 1-1 to 1-18:

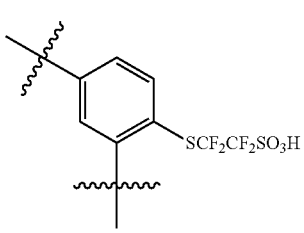

[Chemical Formula 1-1]

[Chemical Formula 1-2]
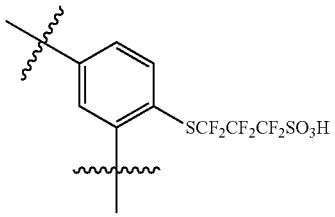
[Chemical Formula 1-3]
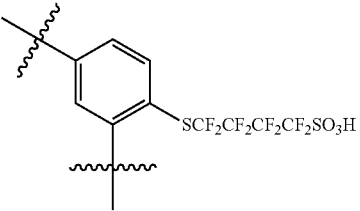
[Chemical Formula 1-4]
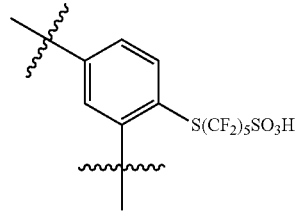
[Chemical Formula 1-5]
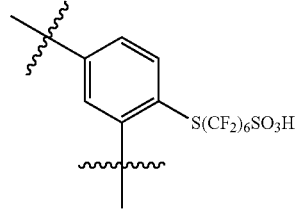
[Chemical Formula 1-6]
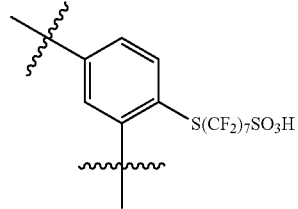
[Chemical Formula 1-7]
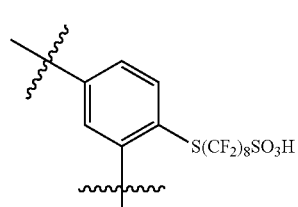
[Chemical Formula 1-8]
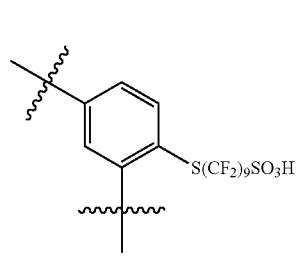
[Chemical Formula 1-9]
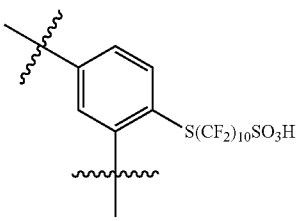
[Chemical Formula 1-10]
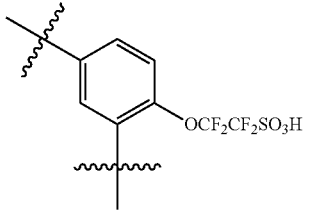
[Chemical Formula 1-11]
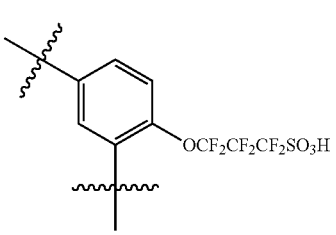
[Chemical Formula 1-12]
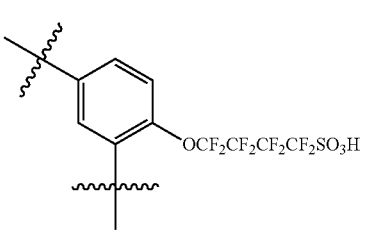
[Chemical Formula 1-13]
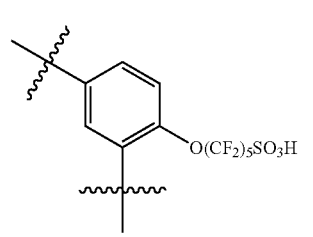
[Chemical Formula 1-14]
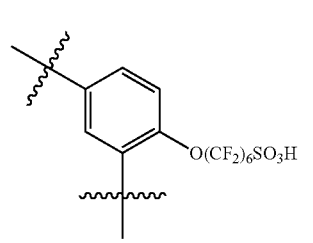

-continued

[Chemical Formula 1-15]

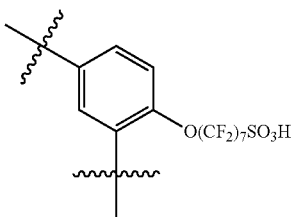

[Chemical Formula 1-16]

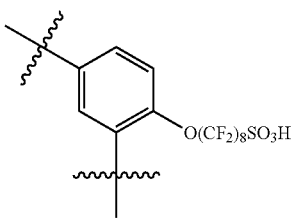

[Chemical Formula 1-17]

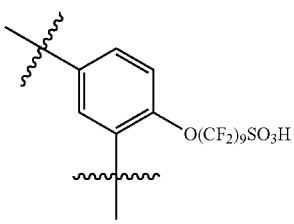

[Chemical Formula 1-18]

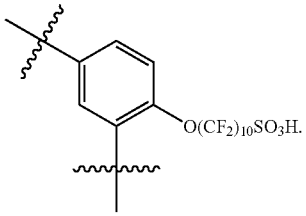

6. The block polymer of claim 1, wherein the unit derived from the compound represented by Chemical Formula 1 is represented by any one of the following Chemical Formulae 1-19 to 1-36:

[Chemical Formula 1-19]

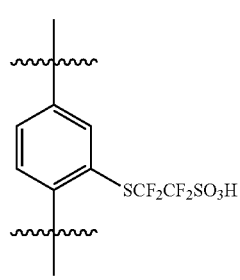

-continued

[Chemical Formula 1-20]

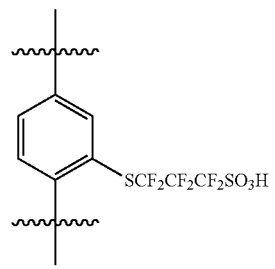

[Chemical Formula 1-21]

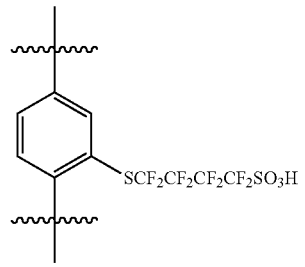

[Chemical Formula 1-22]

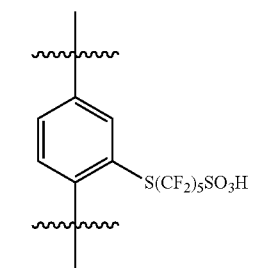

[Chemical Formula 1-23]

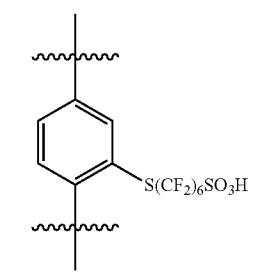

[Chemical Formula 1-24]

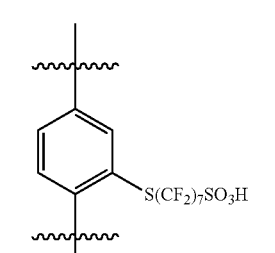

[Chemical Formula 1-25]

[Chemical Formula 1-26]
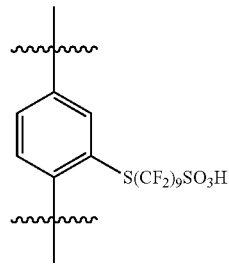
[Chemical Formula 1-27]
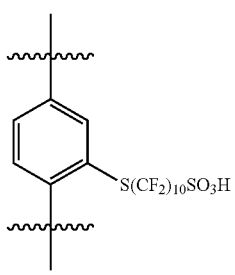
[Chemical Formula 1-28]
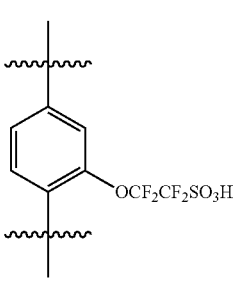
[Chemical Formula 1-29]
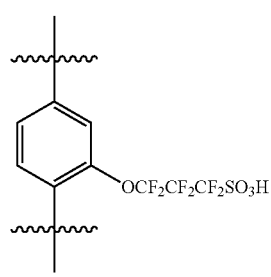
[Chemical Formula 1-30]
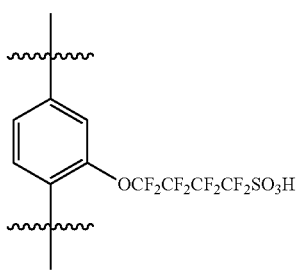
[Chemical Formula 1-31]
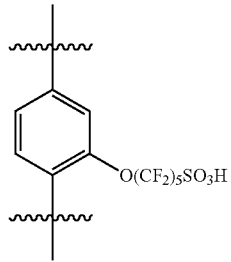
[Chemical Formula 1-32]
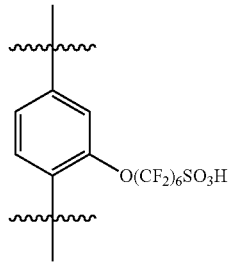
[Chemical Formula 1-33]
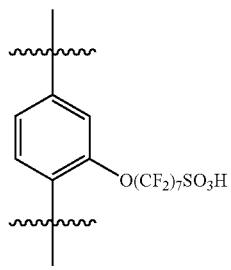
[Chemical Formula 1-34]
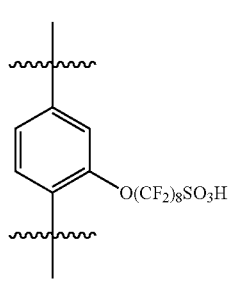
[Chemical Formula 1-35]
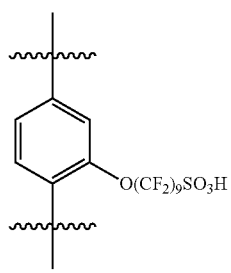

-continued

[Chemical Formula 1-36]

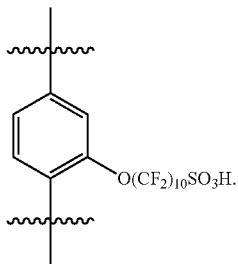

7. The block polymer of claim 1, wherein the unit derived from the compound represented by Chemical Formula 1 is represented by any one of the following Chemical Formulae 1-37 to 1-54:

[Chemical Formula 1-37]

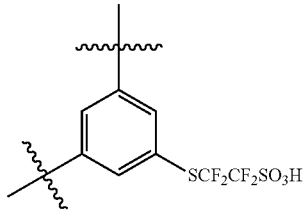

[Chemical Formula 1-38]

SCF$_2$CF$_2$CF$_2$SO$_3$H

[Chemical Formula 1-39]

SCF$_2$CF$_2$CF$_2$CF$_2$SO$_3$H

[Chemical Formula 1-40]

S(CF$_2$)$_5$SO$_3$H

[Chemical Formula 1-41]

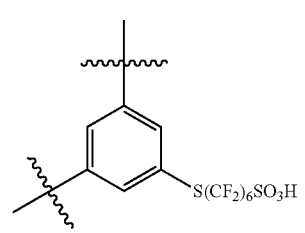
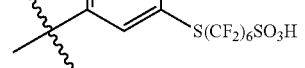

S(CF$_2$)$_6$SO$_3$H

-continued

[Chemical Formula 1-42]

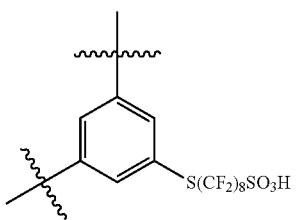

S(CF$_2$)$_7$SO$_3$H

[Chemical Formula 1-43]

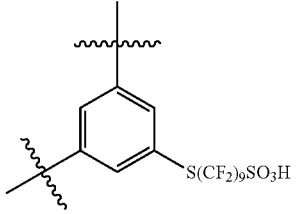

S(CF$_2$)$_8$SO$_3$H

[Chemical Formula 1-44]

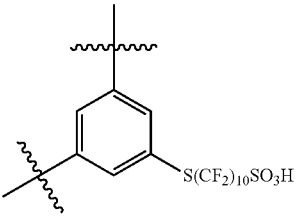

S(CF$_2$)$_9$SO$_3$H

[Chemical Formula 1-45]

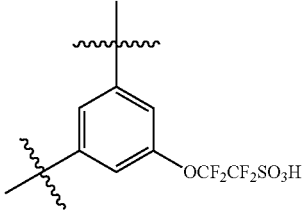

S(CF$_2$)$_{10}$SO$_3$H

[Chemical Formula 1-46]

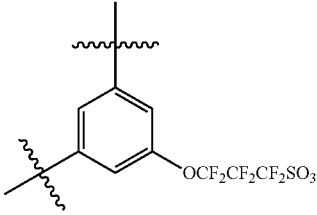

OCF$_2$CF$_2$SO$_3$H

[Chemical Formula 1-47]

OCF$_2$CF$_2$CF$_2$SO$_3$H

[Chemical Formula 1-48]

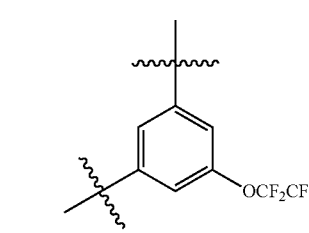

OCF$_2$CF$_2$CF$_2$CF$_2$SO$_3$H

-continued

[Chemical Formula 1-49]
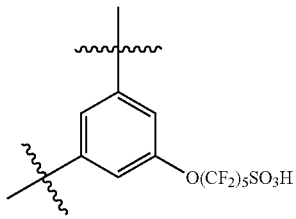

[Chemical Formula 1-50]
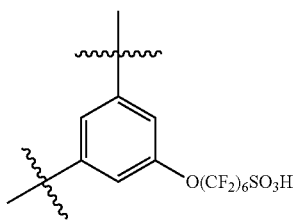

[Chemical Formula 1-51]
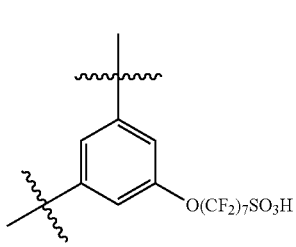

[Chemical Formula 1-52]
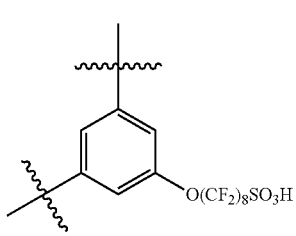

[Chemical Formula 1-53]
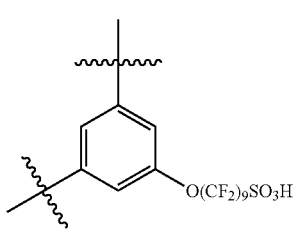

[Chemical Formula 1-54]
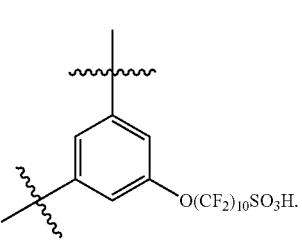

8. The block polymer of claim 1, comprising the hydrophilic block and the hydrophobic block in a molar ratio of 1:0.001 to 1:100 in the block polymer.

9. The block polymer of claim 1, further comprising a brancher derived from a compound represented by the following Chemical Formula 5; or a brancher represented by the following Chemical Formula 6:

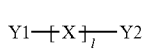
[Chemical Formula 5]

[Chemical Formula 6]

wherein, in Chemical Formulae 5 and 6,

X is S; O; CO; SO; $SO_2$; NR""; a hydrocarbon-based or fluorine-based assembly;

R"" is hydrogen; an aromatic ring substituted with a halogen group; or an aliphatic ring substituted with a halogen group;

l is an integer of 0 to 10;

when l is 2 or greater, 2 or more Xs are the same as or different from each other;

Y1 and Y2 are the same as or different from each other, and each independently an aromatic ring in which one or more are substituted with substituents selected from the group consisting of a hydroxyl group and a halogen group; or an aliphatic ring in which one or more are substituted with substituents selected from the group consisting of a hydroxyl group and a halogen group; and Z is a trivalent organic group.

10. The block polymer of claim 1, which has a weight average molecular weight of 500 g/mol to 5,000,000 g/mol.

11. A polymer electrolyte membrane comprising the block polymer of claim 1.

12. The polymer electrolyte membrane of claim 11, which has ion conductivity of 0.01 S/cm to 0.5 S/cm.

13. The polymer electrolyte membrane of claim 11, which has an ion exchange capacity (IEC) value of 0.01 mmol/g to 5 mmol/g.

14. The polymer electrolyte membrane of claim 11, which has a thickness of 1 μm to 500 μm.

15. A membrane-electrode assembly comprising:
an anode;
a cathode; and
the polymer electrolyte membrane of claim 11 provided between the anode and the cathode.

16. A polymer electrolyte-type fuel cell comprising:
two or more of the membrane-electrode assemblies of claim 15;
a stack comprising a bipolar plate provided between the membrane-electrode assemblies;
a fuel supplying unit supplying fuel to the stack; and
an oxidizer supplying unit supplying an oxidizer to the stack.

17. A redox flow battery comprising:
a positive electrode cell comprising a positive electrode and a positive electrode liquid electrolyte;
a negative electrode cell comprising a negative electrode and a negative electrode liquid electrolyte; and
the polymer electrolyte membrane of claim 11 provided between the positive electrode cell and the negative electrode cell.

* * * * *